US011206425B2

(12) United States Patent
Liao et al.

(10) Patent No.: US 11,206,425 B2
(45) Date of Patent: Dec. 21, 2021

(54) INTER PREDICTION METHODS FOR CODING VIDEO DATA

(71) Applicant: ALIBABA GROUP HOLDING LIMITED, Grand Cayman (KY)

(72) Inventors: Ru-Ling Liao, San Mateo, CA (US); Yan Ye, San Mateo, CA (US); Jie Chen, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/805,537

(22) Filed: Feb. 28, 2020

(65) Prior Publication Data
US 2020/0296416 A1 Sep. 17, 2020

Related U.S. Application Data

(60) Provisional application No. 62/816,869, filed on Mar. 11, 2019.

(51) Int. Cl.
*H04N 19/577* (2014.01)
*H04N 19/61* (2014.01)
*H04N 19/13* (2014.01)
*H04N 19/176* (2014.01)

(52) U.S. Cl.
CPC .......... *H04N 19/577* (2014.11); *H04N 19/13* (2014.11); *H04N 19/176* (2014.11); *H04N 19/61* (2014.11)

(58) Field of Classification Search
None
See application file for complete search history.

(56) References Cited

U.S. PATENT DOCUMENTS

| 2017/0094305 | A1* | 3/2017 | Li ........................ H04N 19/52 |
| 2018/0278949 | A1 | 9/2018 | Karczewicz et al. |
| 2019/0208223 | A1* | 7/2019 | Galpin ................ H04N 19/139 |
| 2019/0222848 | A1* | 7/2019 | Chen ................... H04N 19/176 |

(Continued)

FOREIGN PATENT DOCUMENTS

| CA | 3065492 | 11/2018 |
| WO | WO 2018/121506 A1 | 7/2018 |
| WO | WO 2019/001786 A1 | 1/2019 |

OTHER PUBLICATIONS

International Search Report and written Opinion in International Application No. PCT/US2020/020453, dated Jul. 1, 2020 (24 pgs.).

(Continued)

*Primary Examiner* — Rebecca A Volentine
(74) *Attorney, Agent, or Firm* — Finnegan, Henderson, Farabow, Garrett & Dunner, LLP

(57) ABSTRACT

The present disclosure provides systems and methods for inter prediction process in video data coding. One exemplary method comprises: selecting one of a DMVR process and a BDOF process, based on a video bitstream; and inter predicting an image block based on the selected process. The selection can be made either through explicit signaling, or implicit derivation at the decoder side. According to one exemplary method, selecting the one of the DMVR process and the BDOF process can be performed by selecting the one of the DMVR process and the BDOF process based on: a flag signaled at at least one of a coding unit (CU) level and a coding tree unit (CTU) level, or a merge candidate index associated with an extended merge candidate list.

23 Claims, 19 Drawing Sheets

(56) References Cited

U.S. PATENT DOCUMENTS

| | | | | |
|---|---|---|---|---|
| 2020/0128258 A1* | 4/2020 | Chen | ............... | H04N 19/136 |
| 2020/0228815 A1* | 7/2020 | Xu | ............... | H04N 19/105 |
| 2020/0275112 A1* | 8/2020 | Chiang | ............... | H04N 19/107 |
| 2020/0382807 A1* | 12/2020 | Liu | ............... | H04N 19/513 |

OTHER PUBLICATIONS

Sullivan et al. "Overview of the High Efficiency Video Coding (HEVC) Standard," IEEE Transactions On Circuits and Systems for Video Technology, vol. 22, No. 12, pp. 1649-1668, Dec. 2012.

Chen et al. "Algorithm description of Joint Exploration Test Model 7 (JEM 7)," Joint Video Exploration Team (JVET), JVET-G1001, $7^{th}$ Meeting: Torino, IT, Jul. 13-21, 2017, 51 pages.

Segall et al. "Joint Call for Proposals on Video Compression with Capability beyond HEVC," Joint Video Experts Team (JVET), JVET-G1002, $7^{th}$ Meeting: Torino, IT, Jul. 13-21, 2017, 29 pages.

Bross et al. "Versatile Video Coding (Draft 4)," Joint Video Experts Teams (JVET), JVET-M1001, $13^{th}$ Meeting: Marrakech, MA, Jan. 9-18, 2019, 300 pages.

Chen et al. "Algorithm description for Versatile Video Coding and Test Model 4 (VTM 4)," Joint Video Experts Team (JVET), JVET-M1002, $13^{th}$ Meeting: Marrakech, MA, Jan. 9-18, 2019, 60 pages.

Xiu et al. "CE9-related: Complexity reduction and bit-width control for bi-directional optical flow (BIO)," Joint Video Experts Team (JVET), JVET-L0256, $12^{th}$ Meeting: Macao, CN, Oct. 3-12, 2018.

Sethuraman "CE9: Results of DMVR related Tests CE9.2.1 and CE9.2.2," Joint Video Experts Team (JVET), JVET-M0147, $13^{th}$ Meeting: Marrakech, MA, Jan. 9-18, 2019, 12 pages.

Liao et al. CE10.3.1.b: Triangular prediction unit mode, Joint Video Exploration Team (JVET), JVET-L0124, $12^{th}$ Meeting: Macao, CN, Oct. 3-12, 2018, 8 pages.

Zhao et al. "CE6: Sub-block transform for inter blocks (CE6.4.1)," Joint Video Experts Team (JVET), JVET-M0140, $13^{th}$ Meeting: Marrakech, MA, Jan. 9-18, 2019, 18 pages.

International Telecommunication Union "Series H: Audiovisual and Multimedia Systems Infrastructure of audiovisual services—Coding of moving video—High efficiency video coding." ITU-T H.265 Telecommunication Standardization Sector of ITU, Dec. 2016, 664 pages.

JEM https://jvet.hhi.fraunhofer.de/svn/svn_HMJEMSoftware/.

* cited by examiner

| | Descriptor |
|---|---|
| merge_data( x0, y0, cbWidth, cbHeight ) { | |
| ... | |
| if( sps_triangle_enabled_flag && tile_group_type == B && ciip_flag[ x0 ][ y0 ] == 0 && cbWidth * cbHeight >= 64 ) | |
|   merge_triangle_flag[ x0 ][ y0 ] | ae(v) |
| if( tile_group_type == B && sps_dmvr_enabled_flag && sps_bdof_enabled_flag && cbHeight >= 8 && cbWidth * cbHeight >= 64 && merge_triangle_flag[ x0 ][ y0 ] == 0 ) ⎫ |  |
|   dmvr_flag[ x0 ][ y0 ]   ⎬ 1010 | ae(v) |
| if( merge_triangle_flag[ x0 ][ y0 ] ) { ⎭ | |
|   merge_triangle_split_dir[ x0 ][ y0 ] | ae(v) |
|   merge_triangle_idx0[ x0 ][ y0 ] | ae(v) |
|   merge_triangle_idx1[ x0 ][ y0 ] | ae(v) |
| } else if( MaxNumMergeCand > 1 ) | |
|   merge_idx[ x0 ][ y0 ] | ae(v) |
| ~ | |
| ~ | |
| ~ | |

| 1100 | Descriptor |
|---|---|
| coding_tree_unit( ) { | |
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( tile_group_sao_luma_flag \|\| tile_group_sao_chroma_flag ) | |
|   sao( xCtb >> CtbLog2SizeY, yCtb >> CtbLog2SizeY ) | |
| if( tile_group_alf_enabled_flag ){ | |
|   alf_ctb_flag[ 0 ][ xCtb >> Log2CtbSize ][ yCtb >> Log2CtbSize ] | ae(v) |
|   if( alf_chroma_idc == 1 \|\| alf_chroma_idc == 3 ) | |
|     alf_ctb_flag[ 1 ][ xCtb >> Log2CtbSize ][ yCtb >> Log2CtbSize ] | ae(v) |
|   if( alf_chroma_idc == 2 \|\| alf_chroma_idc == 3 ) | |
|     alf_ctb_flag[ 2 ][ xCtb >> Log2CtbSize ][ yCtb >> Log2CtbSize ] | ae(v) |
|   } | |
| if( tile_group_type == B && sps_dmvr_enabled_flag && sps_bdof_enabled_flag ) | |
|   dmvr_ctb_flag[ xCtb >> CtbLog2SizeY ][ yCtb >> CtbLog2SizeY ] | ae(v) |
| if( tile_group_type == I && qtbtt_dual_tree_intra_flag ) | |
|   dual_tree_implicit_qt_split ( xCtb, yCtb, CtbLog2SizeY, 0 ) | |
| else | |
|   coding_quadtree( xCtb, yCtb, CtbLog2SizeY, 0, SINGLE_TREE ) | |
| } | |

(1110 brace groups the ae(v) descriptor rows)

FIG. 11

| | Descriptor |
|---|---|
| coding_tree_unit( ) { | |
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( tile_group_sao_luma_flag \|\| tile_group_sao_chroma_flag ) | |
| sao( xCtb >> CtbLog2SizeY, yCtb >> CtbLog2SizeY ) | |
| if( tile_group_alf_enabled_flag ){ | |
| alf_ctb_flag[ 0 ][ xCtb >> Log2CtbSize ][ yCtb >> Log2CtbSize ] | ae(v) |
| if( alf_chroma_idc == 1 \|\| alf_chroma_idc == 3 ) | |
| alf_ctb_flag[ 1 ][ xCtb >> Log2CtbSize ][ yCtb >> Log2CtbSize ] | ae(v) |
| if( alf_chroma_idc == 2 \|\| alf_chroma_idc == 3 ) | |
| alf_ctb_flag[ 2 ][ xCtb >> Log2CtbSize ][ yCtb >> Log2CtbSize ] | ae(v) |
| } | |
| if( tile_group_type == B && sps_dmvr_enabled_flag && sps_bdof_enabled_flag ) | |
| dmvr_ctb_flag[ xCtb >> CtbLog2SizeY ][ yCtb >> CtbLog2SizeY ] | ae(v) |
| if( tile_group_type == I && qtbtt_dual_tree_intra_flag ) | |
| dual_tree_implicit_qt_split ( xCtb, yCtb, CtbLog2SizeY, 0 ) | |
| else | |
| coding_quadtree( xCtb, yCtb, CtbLog2SizeY, 0, SINGLE_TREE ) | |
| } | |

1200

1210 (braces around dmvr rows)

FIG. 12A

| merge_data( x0, y0, cbWidth, cbHeight ) { | Descriptor |
|---|---|
| ... | |
| if( sps_triangle_enabled_flag && tile_group_type == B && cip_flag[ x0 ][ y0 ] == 0 && cbWidth * cbHeight >= 64 ) | |
|   merge_triangle_flag[ x0 ][ y0 ] | ae(v) |
| xCtb = ( x0 / CtbSizeY ) * CtbSizeY | |
| yCtb = ( y0 / CtbSizeY ) * CtbSizeY | |
| if( tile_group_type == B && sps_dmvr_enabled_flag && sps_bdof_enabled_flag && cbHeight >= 8 && cbWidth * cbHeight >= 64 && dmvr_ctb_flag[ xCtb >> CtbLog2SizeY ][ yCtb >> CtbLog2SizeY ] && merge_triangle_flag[ x0 ][ y0 ] == 0 ) | |
|   dmvr_flag[ x0 ][ y0 ] | ae(v) |
| if( merge_triangle_flag[ x0 ][ y0 ] ) { | |
|   merge_triangle_split_dir[ x0 ][ y0 ] | ae(v) |
|   merge_triangle_idx0[ x0 ][ y0 ] | ae(v) |
|   merge_triangle_idx1[ x0 ][ y0 ] | ae(v) |
| } else if( MaxNumMergeCand > 1 ) | |
|   merge_idx[ x0 ][ y0 ] | ae(v) |
| ... | |
| } | |

1200

1220 (bracket grouping dmvr rows)

FIG. 12B

| | Descriptor |
|---|---|
| merge_data( x0, y0, cbWidth, cbHeight ) { | |
| ... | |
| if( sps_triangle_enabled_flag && tile_group_type == B && <br> ciip_flag[ x0 ][ y0 ] == 0 && cbWidth * cbHeight >= 64 ) | |
|   merge_triangle_flag[ x0 ][ y0 ] | ae(v) |
| if( tile_group_type == B && sps_dmvr_enabled_flag && sps_bdof_enabled_flag <br> && cbHeight >= 8 && cbWidth * cbHeight >= 1024 && <br> merge_triangle_flag[ x0 ][ y0 ] == 0 ) | |
|   dmvr_flag[ x0 ][ y0 ] | ae(v) |
| if( merge_triangle_flag[ x0 ][ y0 ] ) { | |
|   merge_triangle_split_dir[ x0 ][ y0 ] | ae(v) |
|   merge_triangle_idx0[ x0 ][ y0 ] | ae(v) |
|   merge_triangle_idx1[ x0 ][ y0 ] | ae(v) |
| } else if( MaxNumMergeCand > 1 ) | |
|   merge_idx[ x0 ][ y0 ] | ae(v) |
| ... | |
| ... | |
| } | |

1300

Rows containing the dmvr-related signaling are bracketed as 1310.

FIG. 13

| | Descriptor |
|---|---|
| coding_unit( x0, y0, cbWidth, cbHeight, treeType ) { | |
| ... | |
| if( !pcm_flag[ x0 ][ y0 ] ) { | |
| if( CuPredMode[ x0 ][ y0 ] != MODE_INTRA && merge_flag[ x0 ][ y0 ] == 0 ) | |
| cu_cbf | ae(v) |
| if( cu_cbf ) { | |
| if( CuPredMode[ x0 ][ y0 ] == MODE_INTER && sps_sbt_enabled_flag && | |
| !cip_flag[ x0 ][ y0 ] && !merge_triangle_flag[ x0 ][ y0 ] ) { | |
| if( cbWidth <= MaxSbtSize && cbHeight <= MaxSbtSize ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH || allowSbtVerQ || allowSbtHorH || allowSbtHorQ ) | |
| cu_sbt_flag | ae(v) |
| } | |
| ... | |

INTER PREDICTION METHODS FOR CODING VIDEO DATA

CROSS-REFERENCE TO RELATED APPLICATION

This application claims priority to and the benefits of priority to U.S. Provisional Patent Application No. 62/816,869, filed on Mar. 11, 2019, which is incorporated herein by reference in its entirety.

TECHNICAL FIELD

The present disclosure generally relates to video data processing, and more particularly, to simplified inter prediction processes for coding and decoding video data.

BACKGROUND

Video coding is often used to convert and compress digital video signals, for instance, to reduce storage space consumed or to reduce transmission bandwidth consumption associated with such signals.

A video coding system may involve various tools or techniques to solve different problems involved in the coding process. For example, in the video coding process, the input video data can be partitioned into block units of different sizes and processed block by block. In the prediction process, the blocks can be predicted using various prediction modes, such as intra prediction mode and inter prediction mode. Various techniques have been proposed to improve the efficiency and accuracy of video coding, and to reduce the computational complexity involved.

However, application of different techniques may be subject to different conditions. For example, some techniques may require the coding unit satisfy various conditions, or that the coding unit be coded in a particular mode. Some techniques may only apply to the luma components. Combination of different techniques may not be feasible for processing all the blocks, and may not be practical for certain hardware configurations. It is therefore desirable to properly combine or select different techniques, taking into account of their respective applicability conditions and hardware requirements.

SUMMARY OF THE DISCLOSURE

The embodiments of the present disclosure provide methods and systems for simplification of inter prediction processing. According to some embodiments, additional information may be signaled to indicate which one of the decoder side motion vector refinement (DMVR) process and the bi-directional optical flow (BDOF) process is to be performed in processing video data. One exemplary method comprises: selecting one of a DMVR process and a BDOF process, based on a video bitstream; and inter predicting an image block based on the selected process. Selecting the one of the DMVR process and the BDOF process comprises: selecting the one of the DMVR process and the BDOF process based on a flag signaled at at least one of a coding unit (CU) level and a coding tree unit (CTU) level, or a merge candidate index associated with an extended merge candidate list.

In some embodiments, selection of the DMVR process and the BDOF process for video data processing can be performed through implicit derivation at the decoder side. For example, according to one exemplary method, selecting the one of the DMVR process and the BDOF process can be based on at least one of the following: a distortion of two reference blocks of the image block, a motion vector of the image block, a size of the image block, a shape of the image block, a motion vector associated with a neighboring block of the image block, and signal statistics.

In some embodiments, selection of the DMVR process and the BDOF process for video data processing comprises: splitting the image block into a plurality of sub-blocks; and selecting the one of the DMVR process and the BDOF process for each of the plurality of sub-blocks.

In some embodiments, methods for processing video data are provided. One exemplary method comprises: determining whether a triangle partition mode is applied to inter prediction of an image block; and in response to the triangle partition mode being applied to the inter prediction of the image block, disabling a sub-block transform mode with respect to the image block.

In some embodiments, apparatuses for processing video data are provided. One exemplary apparatus comprises: a memory storing instructions; and a processor configured to execute the instructions to cause the device to: select one of a DMVR process and a BDOF process, based on a video bitstream; and inter predict an image block based on the selected process.

In some embodiments, apparatuses for processing video data are provided. One exemplary apparatus comprises: a memory storing instructions; and a processor configured to execute the instructions to cause the device to: determine whether a triangle partition mode is applied to inter prediction of an image block; and if the triangle partition mode is determined to be applied to the inter prediction of the image block, disable a sub-block transform mode with respect to the image block.

In some embodiments, computer-readable mediums are provided. An exemplary non-transitory computer-readable medium stores a set of instructions that is executable by one or more processors of a video processing device to cause the device to perform a method comprising: selecting one of a DMVR process and a BDOF process, based on a video bitstream; and inter predicting an image block based on the selected process.

In some embodiments, computer-readable mediums are provided. An exemplary non-transitory computer-readable medium stores a set of instructions that is executable by one or more processors of a video processing device to cause the device to perform a method comprising: determining whether a triangle partition mode is applied to inter prediction of an image block; and in response to the triangle partition mode being determined to be applied to the inter prediction of the image block, disabling a sub-block transform mode with respect to the image block.

BRIEF DESCRIPTION OF THE DRAWINGS

Embodiments and various aspects of the present disclosure are illustrated in the following detailed description and the accompanying figures. Various features shown in the figures are not drawn to scale.

FIG. 10 is an exemplary table including a merge data syntax structure with flag signaling, consistent with some embodiments of the present disclosure.

FIG. 11 is an exemplary table including a coding tree unit syntax structure with flag signaling, consistent with some embodiments of the present disclosure.

FIG. 12A is an exemplary table including a coding tree unit syntax structure with flag signaling, consistent with some embodiments of the present disclosure.

FIG. 12B is an exemplary table including a merge data syntax structure with flag signaling, consistent with some embodiments of the present disclosure.

FIG. 13 is an exemplary table including a merge data syntax structure with flag and threshold signaling, consistent with some embodiments of the present disclosure.

FIG. 17 is an exemplary table including a coding unit syntax structure, consistent with some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings may represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
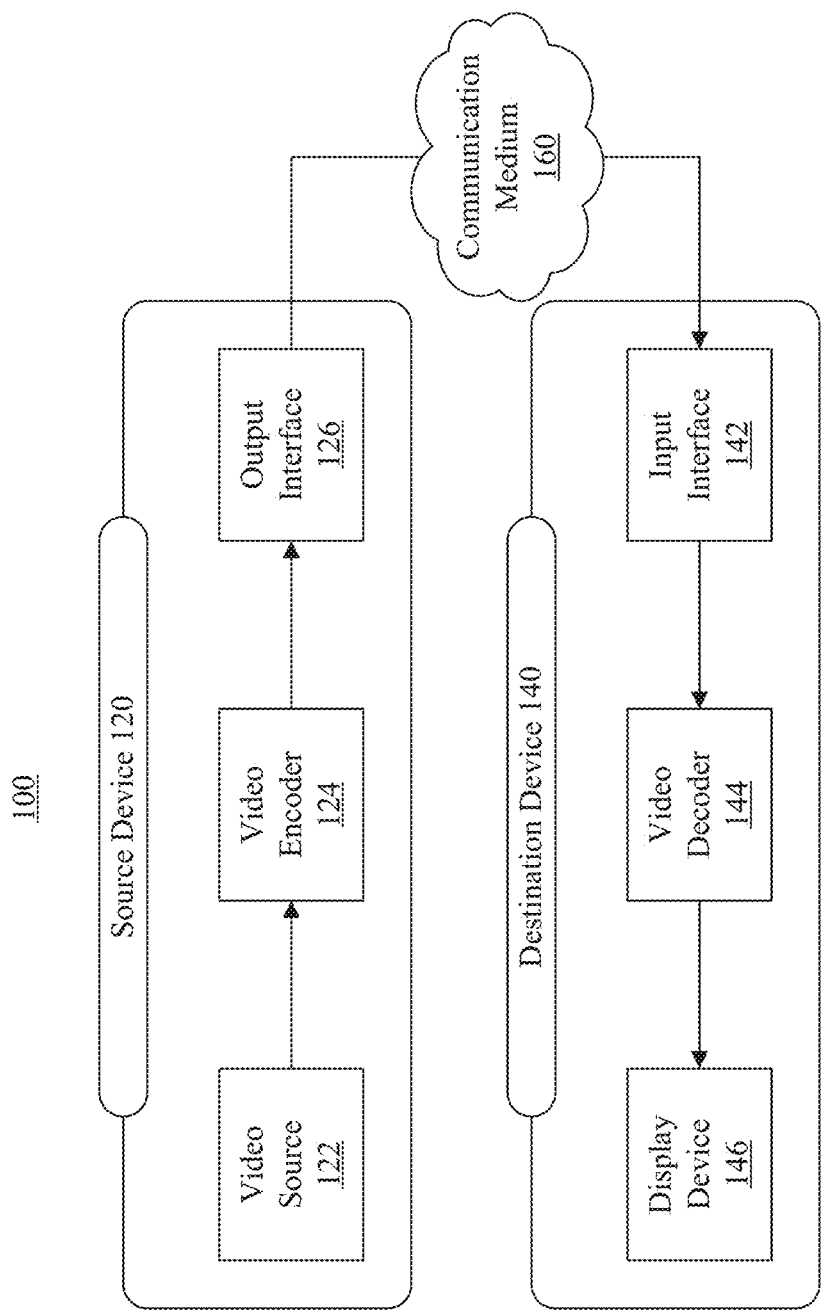
FIG. 1 is a schematic diagram illustrating an exemplary video encoding and decoding system, consistent with some embodiments of the present disclosure.

FIG. 1 is a block diagram illustrating an example video encoding and decoding system 100 that may utilize techniques in compliance with various video coding standards, such as HEVC/H.265 and VVC/H.266. As shown in FIG. 1, system 100 includes a source device 120 that provides encoded video data to be decoded at a later time by a destination device 140. Consistent with some embodiments of the present disclosure, each of source device 120 and destination device 140 may include any of a wide range of devices, such as a desktop computer, a notebook (e.g., laptop) computer, a tablet computer, a set-top box, a mobile phone, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include a video source 122, a video encoder 124, and an output interface 126. Destination device 140 may include an input interface 142, a video decoder 144, and a display device 146. In some embodiments, a source device and a destination device may further include other components or arrangements. For example, source device 120 may receive video data from an external video source (not shown), such as an external camera. Likewise, destination device 140 may interface with an external display device, rather than including an integrated display device.

Although in the following description, some techniques are explained as being performed by a video encoding device, the techniques may also be performed by a video encoder/decoder, typically referred to as a "CODEC." Moreover, the techniques of the present disclosure may also be performed by a video preprocessor. Source device 120 and destination device 140 are merely examples of such coding devices in which source device 120 generates coded video data for transmission to destination device 140. In some embodiments, source device 120 and destination device 140 may operate in a substantially symmetrical manner such that each of source device 120 and destination device 140 includes video encoding and decoding components. Hence, system 100 may support one-way or two-way video transmission between source device 120 and destination device 140, e.g., for video streaming, video playback, video broadcasting, or video telephony.

Video source 122 of source device 120 may include a video capture device, such as a video camera, a video archive containing previously captured video data, or a video feed interface to receive video from a video content provider. As a further alternative, video source 122 may generate computer graphics-based data as the source video, or a combination of live video, archived video, and computer-generated video. The captured, pre-captured, or computer-generated video may be encoded by video encoder 124. The encoded video information may then be output by output interface 126 onto a communication medium 160.

Output interface 126 may include any type of medium or device capable of transmitting the encoded video data from source device 120 to destination device 140. For example, output interface 126 may include a transmitter or a transceiver configured to transmit encoded video data from source device 120 directly to destination device 140 in real-time. The encoded video data may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded video data from source device 120 and provide the encoded video data to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded video data. In some embodiments, a computing device of a medium production facility, such as a disc stamping facility, may receive encoded video data from source device 120 and produce a disc containing the encoded video data.

Input interface 142 of destination device 140 receives information from communication medium 160. The received information may include syntax information including syntax elements that describe characteristics or processing of blocks and other coded units. The syntax information is defined by video encoder 124 and used by video decoder 144. Display device 146 displays the decoded video data to a user and may include any of a variety of display devices such as a cathode ray tube (CRT), a liquid crystal display (LCD), a plasma display, an organic light emitting diode (OLED) display, or another type of display device.

As another example, the encoded video generated by source device 120 may be stored on a file server or a storage device. Input interface 142 may access stored video data from the file server or storage device via streaming or download. The file server or storage device may be any type of computing device capable of storing encoded video data and transmitting that encoded video data to destination device 140. Examples of a file server include a web server that supports a website, a file transfer protocol (FTP) server, a network attached storage (NAS) device, or a local disk drive. The transmission of encoded video data from the storage device may be a streaming transmission, a download transmission, or a combination thereof.

Video encoder 124 and video decoder 144 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in the form of software, a device may store instructions for the software in a suitable, non-transitory computer-readable medium, and execute the instructions in hardware using one or more processors to perform the techniques of this disclosure. Each of video encoder 124 and video decoder 144 may be included in one or more encoders or decoders, either of which may be integrated as part of a combined encoder/decoder (CODEC) in a respective device.

Video encoder 124 and video decoder 144 may operate according to any video coding standard, such as the Versatile Video Coding (VVC/H.266) standard, the High Efficiency Video Coding (HEVC/H.265) standard, the ITU-T H.264 (also known as MPEG-4) standard, etc. Although not shown in FIG. 1, in some embodiments, video encoder 124 and video decoder 144 may each be integrated with an audio encoder and decoder, and may include appropriate MUX-DEMUX units, or other hardware and software, to handle encoding of both audio and video in a common data stream or separate data streams.

Figure 2:
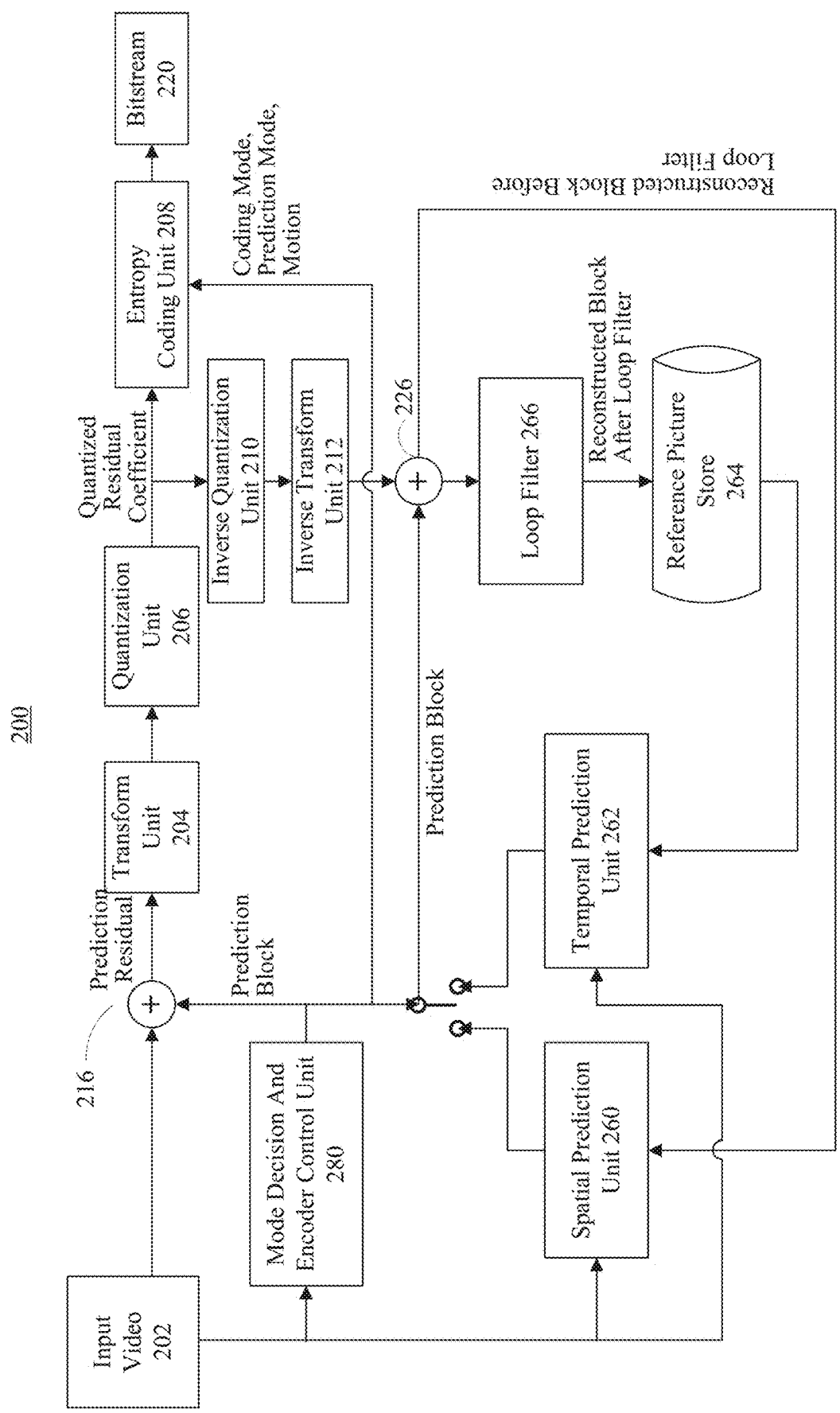
FIG. 2 is a schematic diagram illustrating an exemplary video encoder that may be a part of the exemplary system of FIG. 1, consistent with some embodiments of the present disclosure.

FIG. 2 is a schematic diagram illustrating an exemplary video encoder 200, consistent with the disclosed embodiments. For example, video encoder 200 may be used as video encoder 124 in system 100 (FIG. 1). Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

Figure 3:
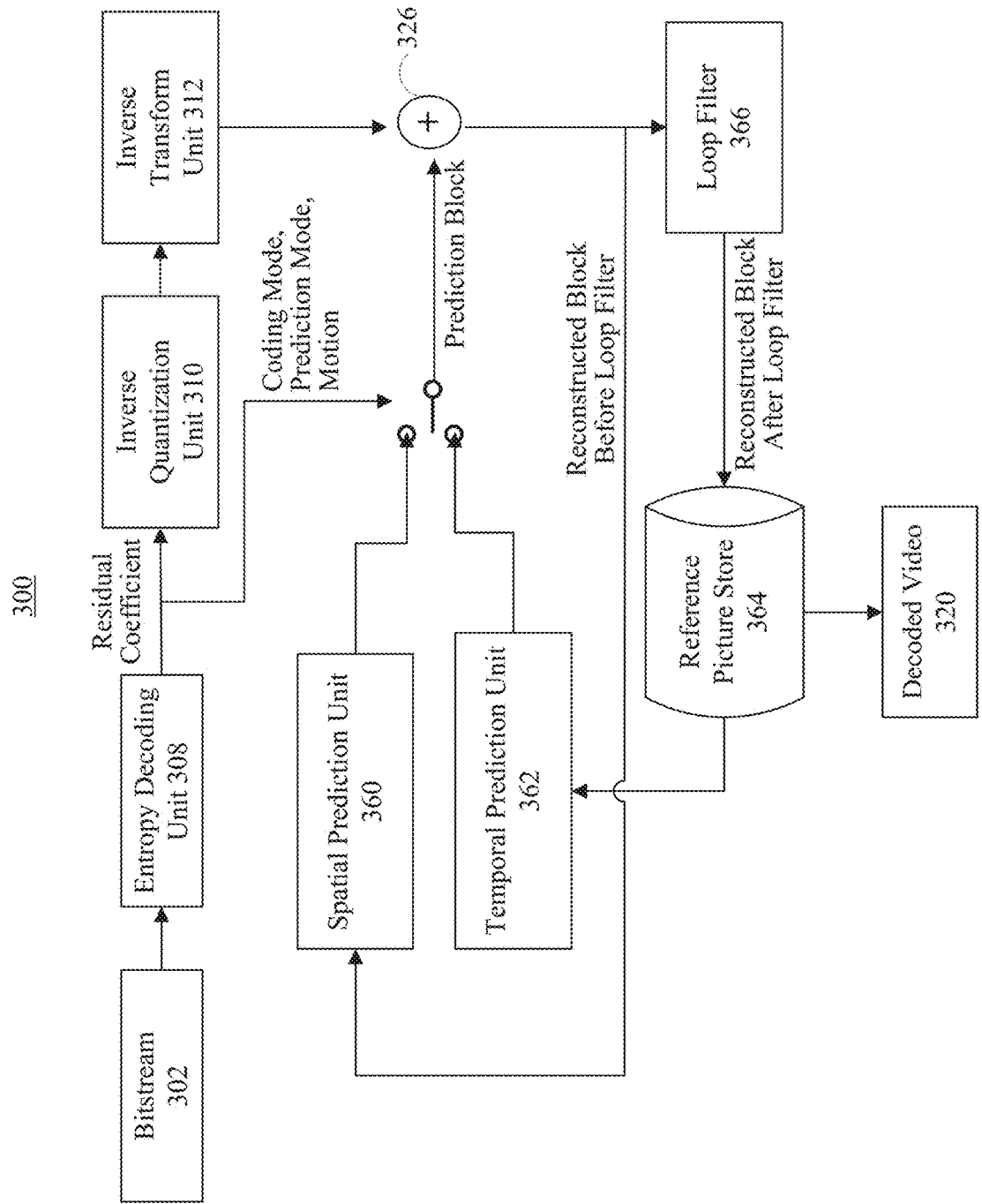
FIG. 3 is a schematic diagram illustrating an exemplary video decoder that may be a part of the exemplary system of FIG. 1, consistent with some embodiments of the present disclosure.

FIG. 3 is a schematic diagram illustrating a video decoder 300, consistent with the disclosed embodiments. For example, video decoder 300 may be used as video decoder 144 in system 100 (FIG. 1). Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as the display device 146 as described in system 100 (FIG. 1).

Figure 4:
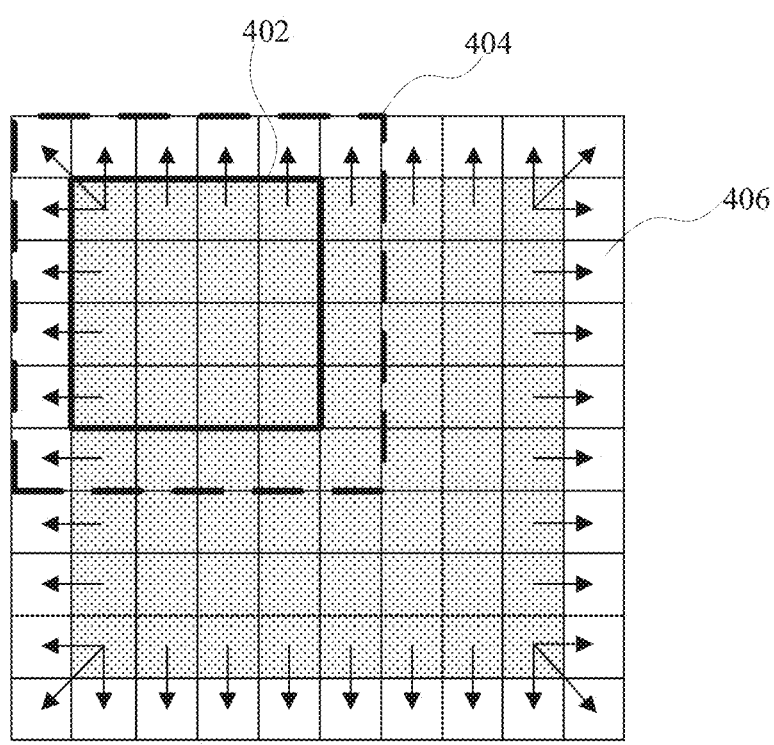
FIG. 4 is a schematic diagram of an example of extended coding-unit (CU) region used in bi-directional optical flow (BDOF), consistent with some embodiments of the present disclosure.

Consistent with some embodiments of the present disclosure, the bi-directional optical flow (BDOF) processing is described below. The BDOF process can be used to refine the bi-prediction signal, for example, the prediction signal of a CU at the 4×4 sub-block level, such as the 4×4 sub-block 402 as shown in FIG. 4. In some embodiments, application of the BDOF process may be subject to certain constraints. For example, the BDOF process may be applied to a CU if the following conditions are satisfied: (1) the CU's height is not 4, and the CU's width is not 4; (2) the CU has more than 64 luma samples; (3) the CU is not coded using affine mode, combined inter and intra prediction mode (CIIP) or the alternative temporal motion vector prediction (ATMVP) merge mode; (4) the CU is coded using true bi-prediction mode (that is, one of the two reference pictures used for coding the CU is prior to the current picture in the display order, and the other is after the current picture in the display order); and (5) the CU is not coded using weighted prediction or bi-prediction with CU-level weight (BCW) mode. In addition, BDOF can be applied to the luma components.

The BDOF process is based on the optical flow concept, which assumes that the motion of an object is smooth. For each 4×4 sub-block, a motion refinement ($v_x$, $v_y$) can be calculated by minimizing the difference between the L0 and L1 prediction samples. The motion refinement can be used to adjust the bi-predicted sample values in the 4×4 sub-block. Exemplary processing involved in the BDOF process is described in the example below.

First, the horizontal and vertical gradients, $$\frac{\partial I^{(k)}}{\partial x}(i, j) \frac{\partial I^{(k)}}{\partial y}(i, j), k = 0, 1,$$

of the two prediction signals can be computed by directly calculating the difference between two neighboring samples, i.e., $$\frac{\partial I^{(k)}}{\partial x}(i, j) = (I^{(k)}(i+1, j) - I^{(k)}(i-1, j)) \gg 4$$

$$\frac{\partial I^{(k)}}{\partial y}(i, j) = (I^{(k)}(i, j+1) - I^{(k)}(i, j-1)) \gg 4$$

where $I^{(k)}(i,j)$ are the sample value at coordinate (i,j) of the prediction signal in list k, k=0,1.

The auto- and cross-correlation of the gradients, $S_1$, $S_2$, $S_3$, $S_5$ and $S_6$, can be calculated as $$S_1 = \Sigma_{(i,j) \in \Omega} \psi_x(i,j) \cdot \psi_x(i,j), \; S_3 = \Sigma_{(i,j) \in \Omega} \theta(i,j) \cdot \psi_x(i,j)$$

$$S_2 = \Sigma_{(i,j) \in \Omega} \psi_x(i,j) \cdot \psi_y(i,j)$$

$$S_5 = \Sigma_{(i,j) \in \Omega} \psi_y(i,j) \cdot \psi_y(i,j) \; S_6 = \Sigma_{(i,j) \in \Omega} \theta(i,j) \cdot \psi_y(i,j)$$

where $$\psi_c(i, j) = \left( \frac{\partial I^{(1)}}{\partial x}(i, j) + \frac{\partial I^{(0)}}{\partial x}(i, j) \right) \gg n_a$$

$$\psi_y(i, j) = \left( \frac{\partial I^{(1)}}{\partial y}(i, j) + \frac{\partial I^{(0)}}{\partial y}(i, j) \right) \gg n_a$$

$$\theta(i, j) = (I^{(1)}(i, j) \gg n_b) - (I^{(0)}(i, j) \gg n_b)$$

where $\Omega$ is a 6×6 window around the 4×4 sub-block, such as 6×6 window 404 around 4×4 sub-block 402, as shown in FIG. 4.

The motion refinement ($v_x$, $v_y$) can be derived using the cross- and auto-correlation terms based on the following:

$$v_x = S_1 > 0 \,?\, \text{clip3}(-th'_{BIO}, th'_{BIO}, -((S_3 \cdot 2^{n_b-n_a}) \gg \lfloor \log_2 S_1 \rfloor)) : 0$$

$$v_y = S_5 > 0 \,?\, \text{clip3}(-th'_{BIO}, th'_{BIO},$$
$$-((S_6 \cdot 2^{n_b-n_a} - ((v_x S_{2,m}) \ll n_{S_2} + v_x S_{2,s})/2) \gg \lfloor \log_2 S_5 \rfloor)) : 0$$

where $$S_{2,m} = S_2 \gg n_{S_2}, S_{2,s} = S_2 \,\&\, (2^{n_{S_2}} - 1), th'_{BIO} = 2^{13-BD}.$$

and $\lfloor \cdot \rfloor$ is the floor function.

Based on the motion refinement and the gradients, the following adjustment can be calculated for each sample in the 4×4 sub-block:

$$b(x, y) = rnd\left(\left(v_x\left(\frac{\partial I^{(1)}(x, y)}{\partial x} - \frac{\partial I^{(0)}(x, y)}{\partial x}\right)\right)/2\right) +$$
$$rnd\left(\left(v_y\left(\frac{\partial I^{(1)}(x, y)}{\partial y} - \frac{\partial I^{(0)}(x, y)}{\partial y}\right)\right)/2\right)$$

The BDOF samples of the CU can be calculated by adjusting the bi-prediction samples as follows:

$$\text{pred}_{BDOF}(x,y) = (I^{(0)}(x,y) + I^{(1)}(x,y) + b(x,y) + o_{offset}) \gg \text{shift}$$

In the above example, the values of $n_a$, $n_b$ and $n_{S_2}$ are equal to 3, 6, and 12, respectively. These values are selected such that the multipliers in the BDOF process do not exceed 15-bit, and the maximum bit-width of the intermediate parameters in the BDOF process is kept within 32-bit.

In order to derive the gradient values, some prediction samples $I^{(k)}(i,j)$ in list k (k=0,1) outside of the current CU boundaries may need to be generated. As shown in FIG. 4, the BDOF process uses one extended row/column 406 around the CU's boundaries. In some embodiments, to control the computational complexity associated with generating the out-of-boundary prediction samples, bilinear filter can be used to generate prediction samples in the extended area. Further, the normal 8-tap motion compensation interpolation filter can be used to generate prediction samples within the CU. These extended sample values can be used in gradient calculation. For the remaining procedures in the BDOF process, if any sample and gradient values outside of the CU boundaries are needed, they can be padded (i.e. repeated) from their nearest neighbors.

Figure 5:
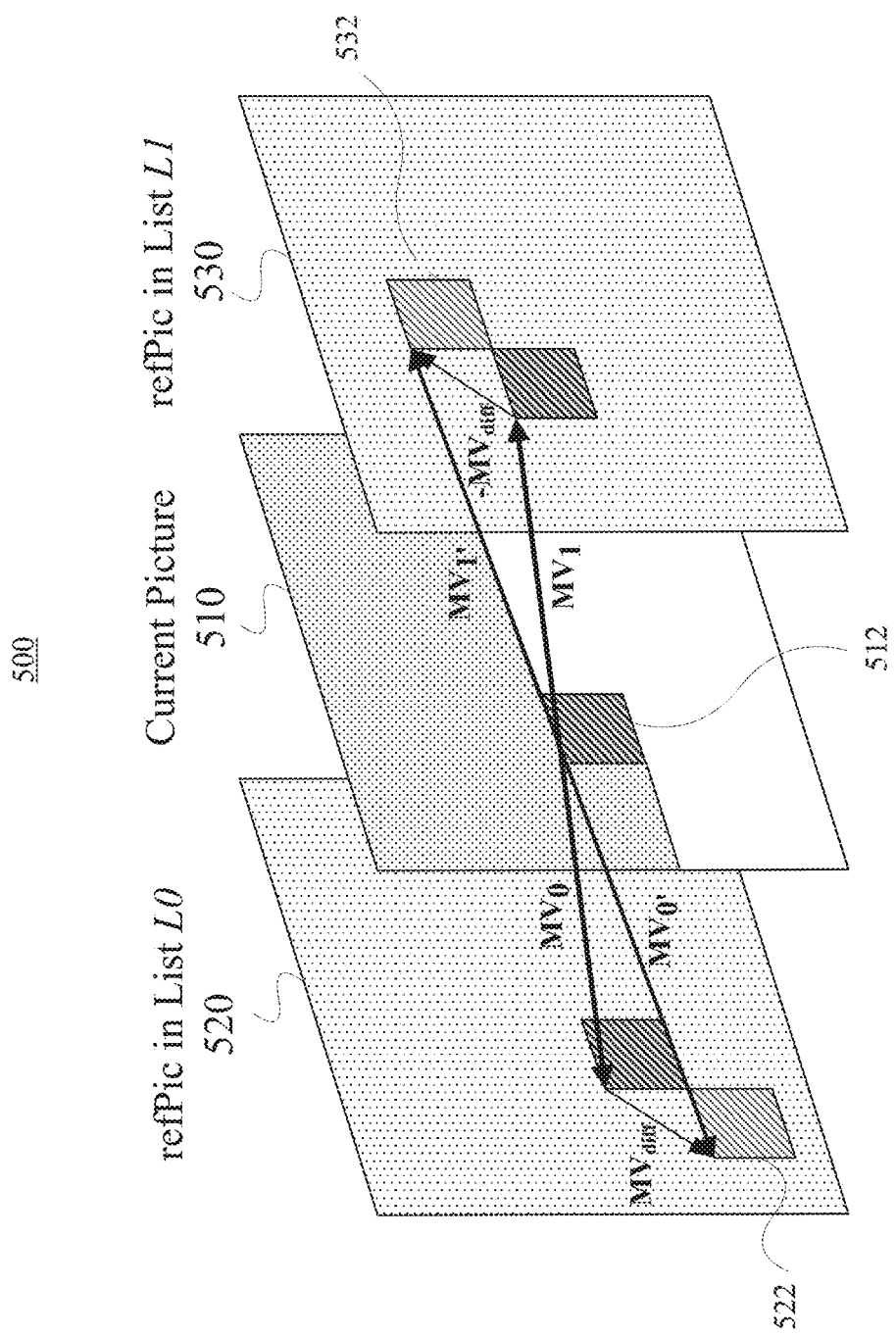
FIG. 5 is a schematic diagram illustrating an example of decoder side motion vector refinement, consistent with some embodiments of the present disclosure.

The decoder side motion vector refinement (DMVR) process is a bilateral-matching (BM) based decoder side motion vector refinement process. The DMVR process can be used to increase the accuracy of the motion vectors (MVs) of the merge mode. In bi-prediction operation, a refined MV can be searched around the initial MVs in the reference pictures, for example, reference picture list L0 and reference picture list L1 (for example, as shown in FIG. 5). The BM method can be used to calculate the distortion between the two reference blocks in the reference picture list L0 and list L1.

FIG. 5 is a schematic diagram illustrating an example of the DMVR process 500, consistent with some embodiments of the present disclosure. As shown in FIG. 5, based on the motion trajectory of the current block 512 in current picture 510, two reference blocks 522 and 532 can be identified in reference pictures 520 and 530. The sum of absolute differences (SAD) between reference blocks 522 and 532 based on each MV candidate around the initial MV can be calculated. The MV candidate with the lowest SAD can be considered as the refined MV and used to generate the bi-prediction signal.

In some embodiments, the DMVR process can be applied for CUs which satisfy the following conditions: (1) CU level merge mode with bi-prediction MV; (2) one reference picture is in the past and another reference picture is in the future with respect to the current picture; (3) the distances (i.e. picture order count (POC) difference) from both reference pictures to the current picture are the same; (4) the CU has more than 64 luma samples and both CU width and CU height are larger than or equal to 8 luma samples; and (5) the CU is not coded using CIIP, weight prediction or BCW mode. The refined MV derived by the DMVR process can be used to generate the inter prediction samples, and can also be used in temporal motion vector prediction for coding future pictures. The original MV can be used in deblocking process, or in spatial motion vector prediction for future CU coding.

As shown FIG. 5, the search points surrounding the initial MV and the MV offset obey the MV difference mirroring rule. In other words, any points that are checked by the DMVR process, denoted by candidate MV pair (MV0, MV1), obey the following two equations:

MV0'=MV0+MV_offset

MV1'=MV1−MV_offset, where MV_offset represents the refinement offset between the initial MV and the refined MV in a reference picture. In some embodiments, the refinement search range can be two integer luma samples from the initial MV.

Figure 6:
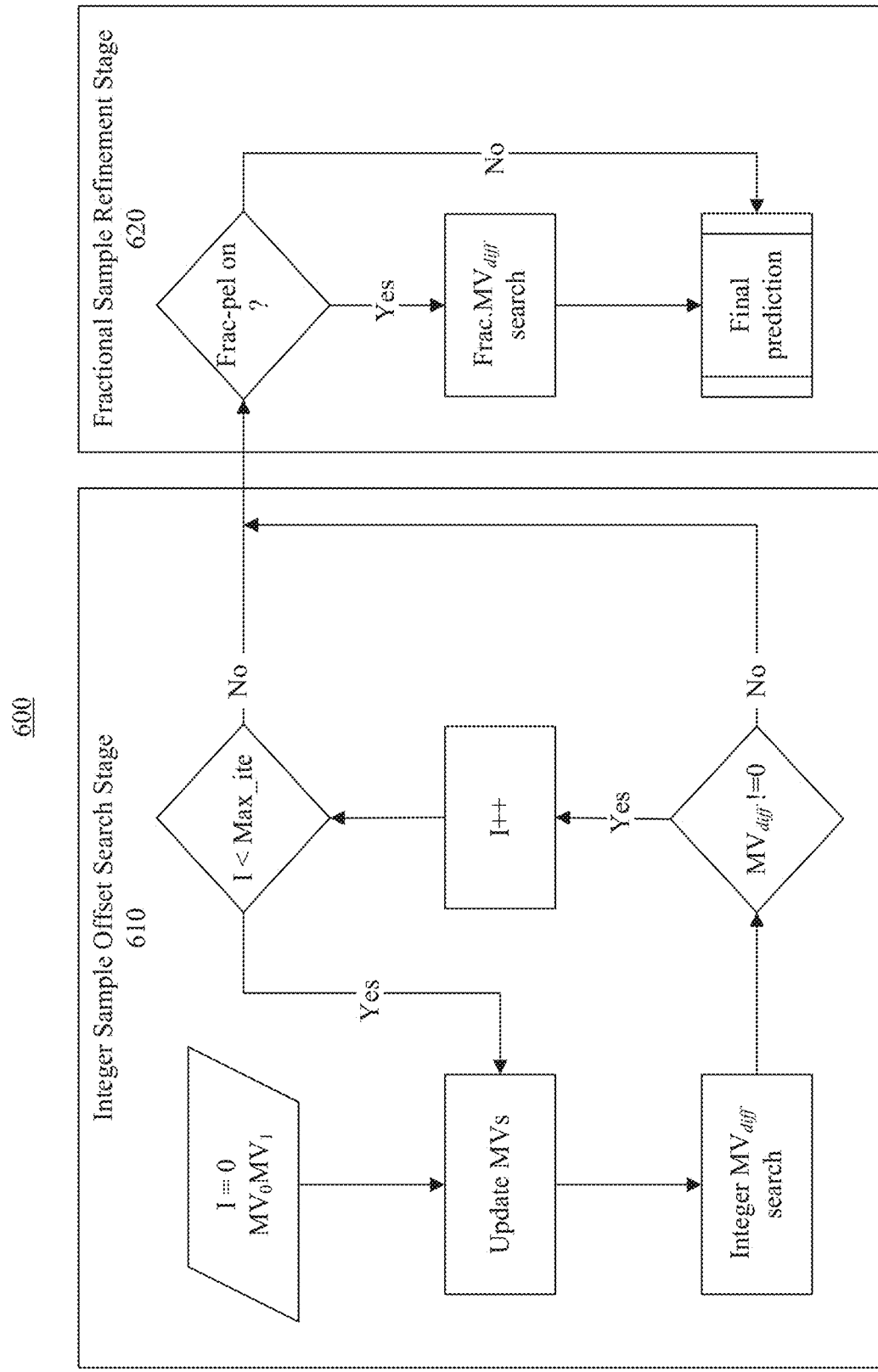
FIG. 6 is a schematic diagram illustrating an exemplary decoder-side-motion-vector-refinement (DMVR) searching procedure, consistent with some embodiments of the present disclosure.

FIG. 6 illustrates an exemplary DMVR searching process 600 of DMVR, consistent with some embodiments of the present disclosure. As shown in FIG. 6, the searching process can include an integer sample offset search stage 610 and a fractional sample refinement stage 620. In some embodiments, to reduce the search complexity, a searching method with an early termination mechanism can be applied in the integer sample offset search stage 610. For example, instead of 25 points full search, a 2-iteration search scheme can be applied to reduce the number of SAD checking points.

Figure 7:
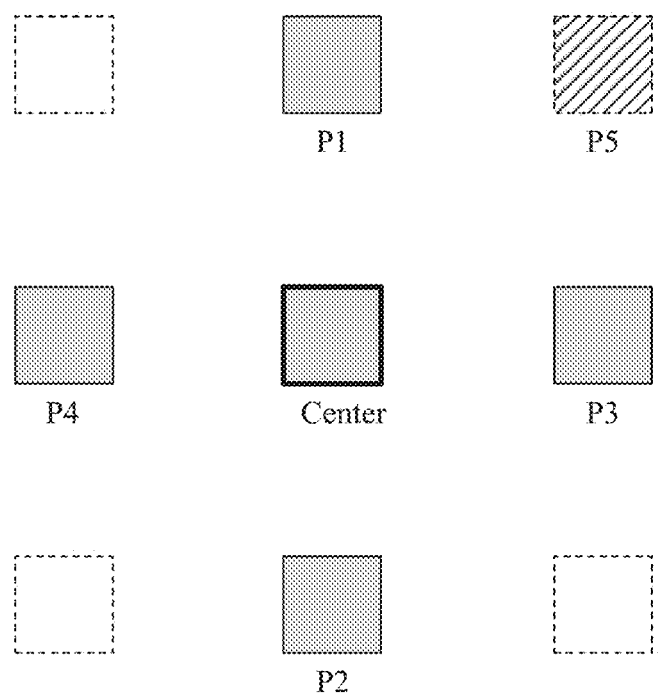
FIG. 7 is a schematic diagram illustrating an example of DMVR integer luma sample searching pattern, consistent with some embodiments of the present disclosure.

As shown in FIG. 7, a maxim of 6 SADs can be checked in the first iteration. First, the SAD of the five points (center and P1~P4) are compared. If the SAD of the center position is the smallest, the integer sample offset stage of the DMVR process (namely, 610 in FIG. 6) can be terminated. If the SAD of the center position is not the smallest, one more position P5 can be checked. P5 can be determined by the SAD distribution of P1~P4. The position (among P1~P5) with the smallest SAD can be selected as the center position of the second iteration search. The process of the second iteration search can be substantially similar to that of the first iteration search. The SAD calculated in the first iteration can be re-used in the second iteration. Therefore, SAD of only 3 additional points may need to be further calculated.

Referring back to FIG. 6, integer sample offset search stage 610 can be followed by fractional sample refinement stage 620. In some embodiments, the fractional sample refinement can be derived by using parametric error surface equation, instead of additional search with SAD comparison.

That way, computational complexity may be reduced. The fractional sample refinement stage 620 can be invoked based on the output of the integer sample offset search stage. As noted above, the integer sample offset search stage 610 may be terminated if the center position has the smallest SAD. This may occur in either the first iteration or the second iteration search. If this occurs, fractional sample refinement stage 620 can be further applied.

In parametric error surface based sub-pixel offsets estimation, the center position cost and the costs at the four neighboring positions from the center can be used to fit a 2-D parabolic error surface equation as follows:

$$E(x,y)=A(x-x_{min})^2+B(y-y_{min})^2+C,$$

where $(x_{min}, y_{min})$ corresponds to the fractional position with the least cost and C corresponds to the minimum cost value. By solving the above equations using the cost value of the five search points, the $(x_{min}, y_{min})$ can be computed as:

$$x_{min}=(E(-1,0)-E(1,0))/(2(E(-1,0)+E(1,0)-2E(0,0)))$$

$$y_{min}=(E(0,-1)-E(0,1))/(2(E(0,-1)+E(0,1)-2E(0,0)))$$

The value of $x_{min}$ and $y_{min}$ can be constrained to be between −8 and 8, since all cost values are positive and the smallest value is E(0,0). This can correspond to half-pel offset with 1/16th-pel MV accuracy. The computed fractional $(x_{min}, y_{min})$ can be added to the integer distance refinement MV to obtain the sub-pixel accurate refinement delta MV.

A brief description of bilinear-interpolation and sample padding is provided below. In VVC, for example, the resolution of the MVs is 1/16th luma samples. The samples at the fractional positions are interpolated using an 8-tap interpolation filter. In the DMVR process, the search points surround the initial fractional-pel MV with integer sample offset. Therefore, the samples of those fractional positions may need to be interpolated for the DMVR search process. To reduce the calculation complexity, the bi-linear interpolation filter can be used to generate the fractional samples for the DMVR searching process.

Another feature of using bi-linear filter is that with 2-sample search range, the DMVR process does not access more reference samples compared to the normal motion compensation process. After the refined MV is attained with the DMVR search process, an 8-tap interpolation filter can be applied to generate the final prediction. The samples, which are not needed for the interpolation process based on the original MV but needed for the interpolation process based on the refined MV, can be padded (e.g. repeated) from those available samples. That way, the DMVR search process does not need to access more reference samples than the normal motion compensation process.

When the width and/or height of a CU are larger than 16 luma samples, it can be further divided into sub-blocks with width and/or height equal to 16 luma samples. Consistent with some embodiments of the present disclosure, the maximum unit size for the DMVR searching process can be limited to 16×16.

Figure 8:
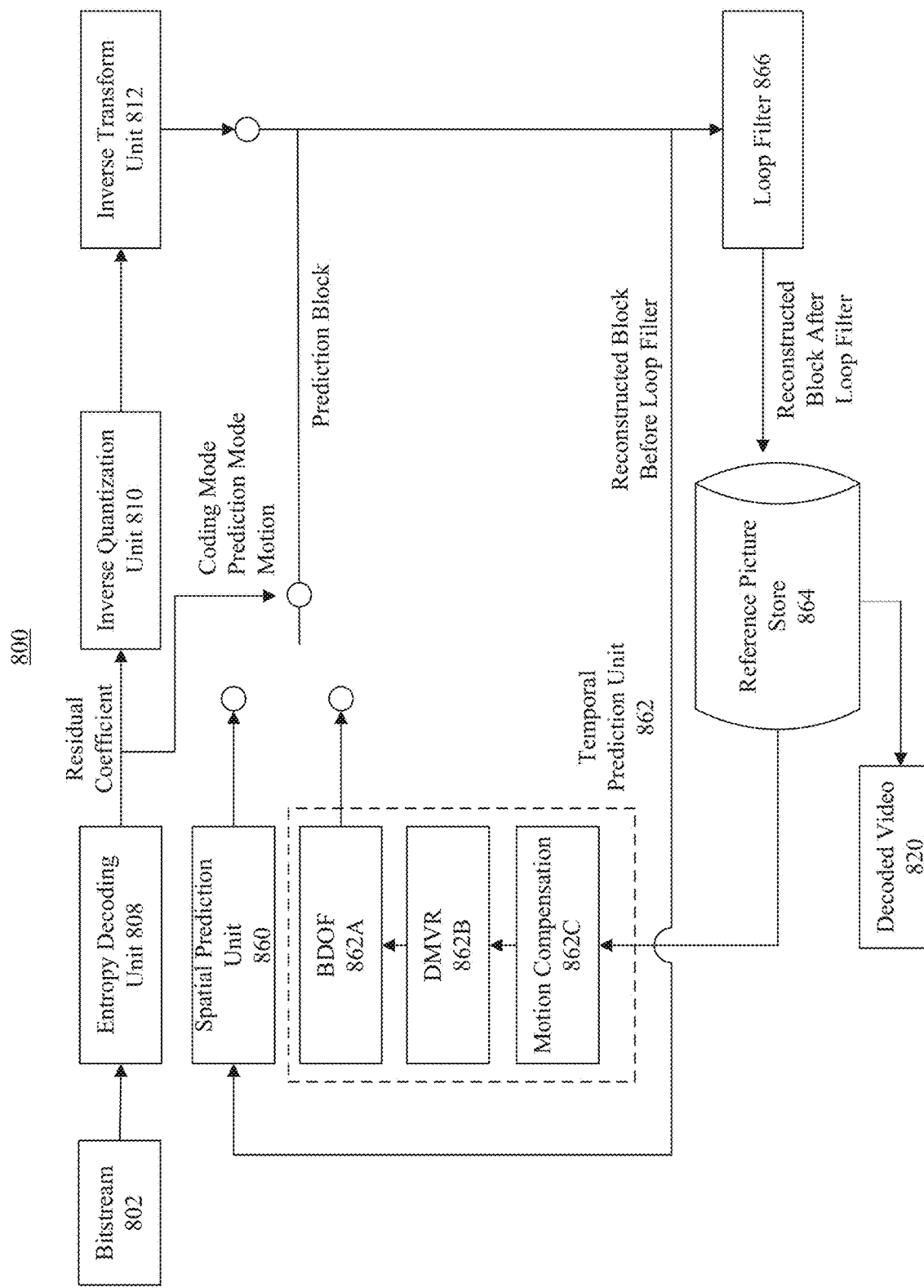
FIG. 8 is a schematic diagram illustrating exemplary DMVR and BDOF processes implemented by a decoder, consistent with some embodiments of the present disclosure.

In some embodiments, a combination of the BDOF process and the DMVR process can be implemented. For example, to predict an inter block, multiple processes including motion compensation, the DMVR process and the BDOF process may need to be performed. As illustrated in FIG. 8, the refined motion vector after the DMVR process can be used as the initial motion vector of BDOF process. In some embodiments, consistent with FIG. 8, the DMVR process and the BDOF process can be sequentially processed.

As shown in the exemplary decoder 800 in FIG. 8, the temporal prediction unit 862 can include components to respectively perform motion compensation at 862C, the DMVR process at 862B, and the BDOF process at 862A. The processing output from the DMVR process at 862B is used as the input for the BDOF process at 862A. Decoder 800 further includes various other units to process bitstream 802, for example, entropy decoding unit 808, inverse quantization unit 810, inverse transform unit 812, spatial prediction unit 860, loop filter 866, and reference picture store 864. Decoded video 820 may be obtained based on the decoded data in reference picture store 864. The above units and components may perform similar processing as those performed by corresponding units described above with reference to FIG. 3, the details of which are not repeated herein.

In some embodiments of the present disclosure, a merge mode is implemented in which the motion information of the current CU can be directly derived by the spatially or temporally coded blocks. In the merge mode, multiple motion information candidates are derived and put into a merge candidate list. The encoder can select one from the candidate list and signal it in the bitstream. The merge candidate list can be constructed by including the following five types of candidates in the following order: (1) spatial motion vector prediction (MVP) candidates from spatial neighbor CUs; (2) temporal MVP candidates from collocated CUs; (3) history-based MVP candidates from a First in, First Out (FIFO) table; (4) pairwise average MVP candidates; and (5) zero MVs.

In some embodiments, the size of the merge candidate list can be indicated in the slice header and the maximum allowed size of the merge candidate list can be, for example, 6. For each CU coded using merge mode, an index of the best merge candidate can be encoded using truncated unary (TU) binarization. The first bin of the merge index can be coded with context. For the other bins, bypass coding can be used.

In some embodiments, both the DMVR process and the BDOF process can be only applied on CUs coded using merge mode. After determining the merge candidate (that is, the motion information is determined for the current CU), the decoder can check the DMVR and BDOF applicability conditions. As noted above, the merge candidate can be indicated by the merge index. If the conditions are satisfied, one or both of the DMVR process and the BDOF process can be applied. Depending on applicability conditions such as the motion information and the block size, a merge mode coded CU may be processed by the DMVR process only, the BDOF process only, both of them, or neither of them.

As described above with reference to FIG. 8, the DMVR and the BDOF processes can both be applied for coding certain CUs. However, sequential processing of the DMVR and BDOF process can be expensive and may not be practical for some hardware designs. In certain hardware architecture, the two processes are put into the same hardware pipeline stage. Due to the complex computation of the DMVR and the BDOF processes, it may not be practical to fit both processes into the hardware cycle limitation. In addition, the DMVR process and the BDOF process are applied when the applicability conditions are satisfied. However, this may not be suitable for all blocks.

Figure 9:
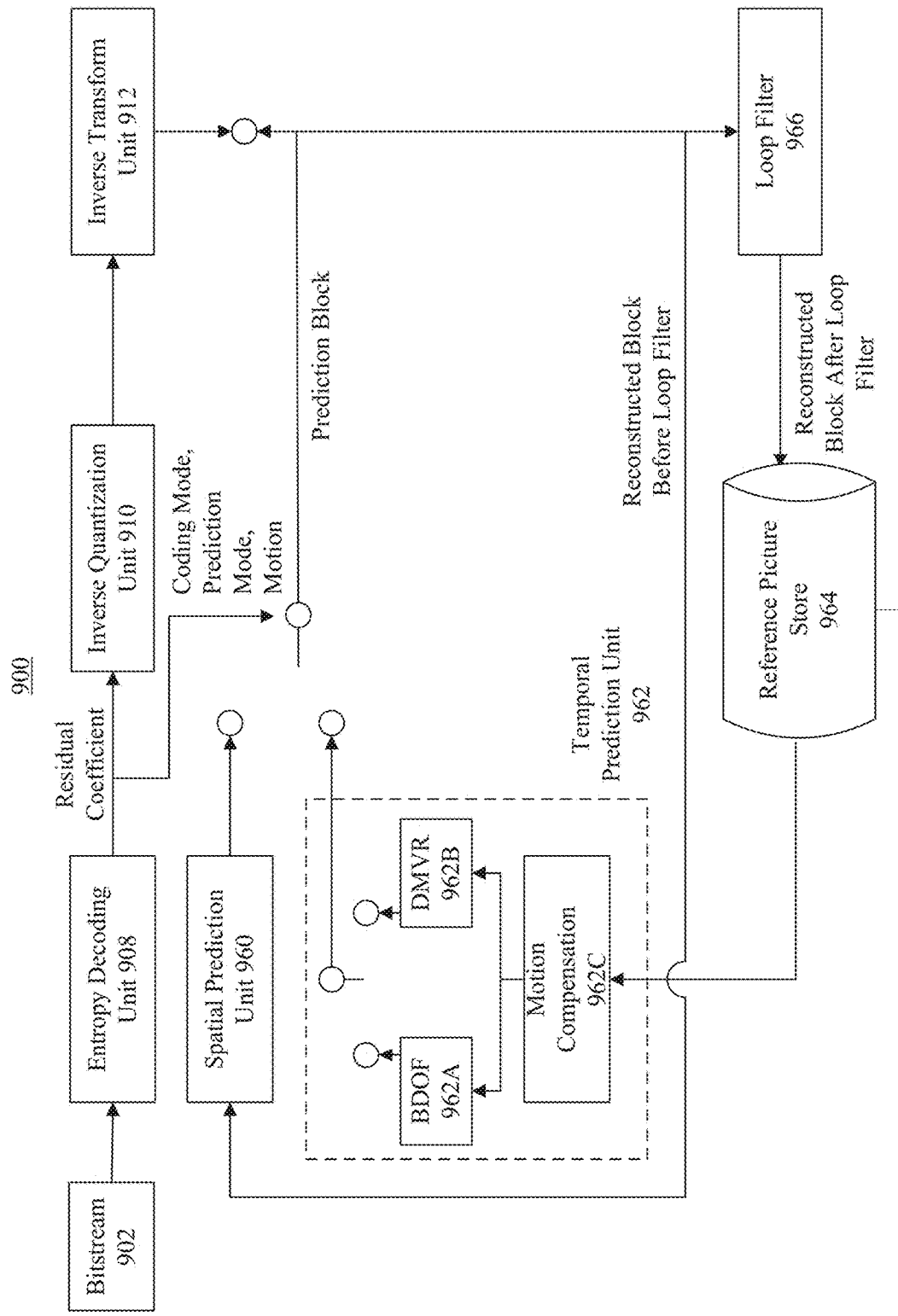
FIG. 9 is a schematic diagram illustrating exemplary DMVR and BDOF processes implemented by a decoder, consistent with some embodiments of the present disclosure.

To address the above problems, in some embodiments of the present disclosure, only one of the DMVR and the BDOF processes is to be performed. As shown in FIG. 9, temporal prediction unit 962 can include components to respectively perform motion compensation at 962C, and one of the DMVR process at 962B and the BDOF process at 962A. That is, when the DMVR process is performed at 962B, the BDOF process at 962A is not performed. Similarly, if the BDOF process at 962A is performed, then the DMVR process at 962B is not performed. The decoder 900 as shown in FIG. 9 further includes various other units to process bitstream 902, for example, entropy decoding unit 908, inverse quantization unit 910, inverse transform unit 912, spatial prediction unit 960, loop filter 966, and reference picture store 964. Decoded video 920 may be obtained based on the decoded data in reference picture store 964. The above units and components may perform similar processing as those performed by corresponding units described above with reference to FIG. 3, the details of which are not repeated herein.

According to some embodiments of the present disclosure, additional information can be provided in the bitstream to determine whether the DMVR process or the BDOF process is applied. The additional information can be explicitly signaled. For example, a flag can be signaled to indicate whether the DMVR process or the BDOF process is performed. The flag may be signaled at different levels. In some embodiments, a higher-level flag can be signaled to indicate which one of the DMVR and the BDOF processes is performed when both of the processes can be applied to the same block. This higher-level flag may be signaled at the sequence parameter set (SPS) level, the picture parameter set (PPS) level, the picture header structure syntax, the slice header, the tile group level, or the CTU level.

As an example, the flag may be signaled at the CU level, together with the merge index, as shown in table 1000 illustrated in FIG. 10. The syntax element dmvr_flag (see syntax element 1010 in FIG. 10) can be used to indicate which one of the DMVR process and the BDOF process is applied to the inter predicted block. If the flag is not present or not signaled, the flag can be considered to be 0, which indicates a default process is to be applied. The default process can be set to indicate the DMVR process, or alternatively, the BDOF process.

In some embodiments, the flag may be signaled at the CTU level, as shown in table 1100 illustrated in FIG. 11. The syntax dmvr_ctb_flag (see syntax element 1110) can be shared among all the CUs within a CTU, and is used to indicate which one of the DMVR process and the BDOF process is performed for all the CUs. If the flag is not present or not signaled at the CTU level, the flag can be considered to be 0, which indicates a default process is to be applied for all the CUs within the CTU. The default process can be set to indicate the DMVR process, or alternatively, the BDOF process.

In some embodiments, a first flag may be signaled at the CTU level and a second flag may be signaled at the CU level. As shown in table 1200 illustrated in FIGS. 12A and 12B, the syntax dmvr_ctb_flag (see syntax element 1210 in FIG. 12A) at the CTU level can be used to indicate whether the CU level dmvr_flag is signaled or not. For example, if the dmvr_ctb_flag is equal to 1, the flag can indicate that the dmvr_flag is signaled at the CU level. On the other hand, when the dmvr_ctb_flag is not present, the flag can be considered to be 0, which can be used to indicate that the dmvr_flag is not signaled at the CU level. That is, the syntax dmvr_flag at the CU level is only signaled when the dmvr_ctb_flag at the CTU level is equal to 1.

As an example of the above, when dmvr_ctb_flag (see syntax element 1210 in FIG. 12A) is equal to 1, a CU level flag dmvr_flag (see syntax element 1220 in FIG. 12B) is signaled to indicate which one of the DMVR process and the BDOF process is performed for the CU. When dmvr_ctb_flag (see syntax element 1210 in FIG. 12A) is equal to 0, it can be used to indicate that all the CUs within this CTU is coded with a default process. The default process can be set to be either the BDOF process, or the DMVR process. No CU level flag is signaled.

In some embodiments, context-adaptive binary arithmetic coding (CABAC) may be applied to code the dmvr_flag. The CABAC context may depend on characteristics of the block. For example, the characteristics can relate to the size of the block, such as the number of luma samples, the width of the block, the height of the block, or both the width and height of the block. Further, the CABAC context may depend on dmvr_flag of the neighboring blocks. For example, the block to its left and/or the block on top may be used to form the CABAC context.

According to some embodiments of the present disclosure, whether the DMVR process or the BDOF process is performed can be signaled through the merge candidate index. In some embodiments, the number of merge candidates in the merge candidate list can be doubled. Specifically, suppose that the original merge candidate list includes a set of M candidates with the index from 0 to M−1. A second set of M candidates, same as the original set of M candidates, can be inserted at the end of the merge candidate list, to generate an extended merge candidate list. That is, the M candidates are repeated in the merge candidate list. Therefore, the candidate with the index x (0≤x<M) is the same as the candidate with index x+M. If one of the first set (i.e., the original set) of M candidates is indicated in the bitstream, one of the DMVR process and the BDOF process is selected and performed. Alternatively, if one of the second set of M candidates is indicated in the bitstream, the other one of the DMVR process and the BDOF process is to be performed. As an example, if one of the first set of M candidates is indicated in the bitstream, it can indicate that the DMVR process is to be performed. Alternatively, if one of the second set of M candidates is indicated in the bitstream, then the BDOF process is to be performed. That way, only one of the DMVR and the BDOF processes is applied to one block, as indicated by the merge candidate index.

In some embodiments, similar to the embodiments described above, the number of merge candidates in the merge candidate list can be doubled. Suppose that the original merge candidate list includes a set of M candidates with the index from 0 to M−1. A second set of M candidates, same as the original M candidates, can be inserted at the end of the candidate list, to generate an extended merge candidate list. That is, the M candidates are repeated in the merge candidate list. The candidate with the index x (0≤x<M) is the same as the candidate with index x+M. Different from the embodiments described above, the positions of the DMVR candidates and the BDOF candidates can be adaptively changed. For example, depending on the size and the shape of the current CU, the first set (i.e., original set) of M candidates can be considered being processed using the DMVR process and the second set of M candidates can be considered being processed by the BDOF process. Alternatively, the first set of M candidates can be considered being processed by the BDOF process and the second set of M candidates can be considered being processed by the DMVR process. In some embodiments, the positions of the DMVR candidates and BDOF candidates may be signaled in the bitstream, such as in the slice header, PPS, or SPS.

In some embodiments, only a subset of the merge candidates are repeated in the merge candidate list. Suppose that the original merge candidate list includes 6 merge candidates with index from 0 to 5. Candidate 0, candidate 1 and candidate 5 satisfy DMVR conditions, and candidate 1, candidate 3 and candidate 5 satisfy BDOF conditions. As noted above with reference to FIG. 8, both the DMVR process and the BDOF process can be applied for candidate 1 and candidate 5, as they satisfy the conditions of both processes. In some embodiments, only candidate 1 and candidate 5 are repeated in the merge candidate list as candidates 6 and 7, respectively. To fix the length of merge candidate list, zero MVs can be filled in until the number of candidates in the list is equal to 12. The positions of the DMVR and the BDOF candidates may be fixed. If candidate 1 or candidate 5 is indicated in the bitstream, only DMVR (or BDOF) is applied. Alternatively, if candidate 6 or candidate 7 is indicated in the bitstream, only BDOF (or DMVR) is applied.

In some embodiments, the position of the DMVR and the BDOF candidates can be adaptively changed. In the above example, depending on the size and the shape of the current CU, or based on information indicated in the bitstream, the DMVR process can be applied for candidate 1 or candidate 5, the BDOF process can be applied for candidate 6 or candidate 7. Alternatively, the BDOF process can be applied on candidate 1 or candidate 5, the DMVR process can be applied on candidate 6 or candidate 7.

Based on the embodiments described above, selection of the DMVR process or the BDOF process can be implemented through explicit signaling. One advantage of explicit signaling is that it can reduce the complexity of the DMVR and BDOF hardware implementation. Although this could increase signaling cost, through explicit signaling, the encoder may select one of the DMVR process and the BDOF process by means of rate distortion cost. That way, coding efficiency can be improved.

In some embodiments of the present disclosure, implicit derivation at decoder side regarding selection of the DMVR process and the BDOF process can be implemented. According to some embodiments, when the conditions for applying the DMVR and the BDOF processes are both met for the same block, one of the two processes can be disabled. For example, when the conditions for applying both processes are met with respect to a certain block, the BDOF process can be disabled, so the DMVR process is applied for that block. Alternatively, when the conditions for applying both processes are met with respect to a certain block, the DMVR process can be disabled, so the BDOF process is applied for that block.

In some embodiments, the DMVR or the BDOF process may be selected at the CU level at the decoder side. The selection may be based on the distortion of two reference blocks of the current CU, the motion vectors of current CU, the size of the current CU, the shape of the current CU, or the motion vectors and/or prediction mode of neighboring blocks of the current CU, as further described in the following examples.

In some embodiments, the selection can be based on the distortion of two reference blocks of the current CU (e.g., two reference blocks used for bi-predicting the current CU). When the distortion of two reference blocks is smaller than a pre-defined threshold, a default mode is applied for the current CU, and the other mode can be disabled. The default mode can be the DMVR process, in which case the BDOF process can be disabled. Alternatively, the default mode can be the BDOF process, in which case the DMVR process can be disabled.

In some embodiments, the selection can be based on the motion vectors of the current CU. When it is determined that the motion vectors of the current CU are symmetric to each other, the default mode can be applied for the current CU and the other mode can be disabled. If the motion vectors of the current CU are not symmetric to each other, the default mode can be disabled and the other mode can be applied. It is appreciated that the default mode can be either the DMVR process or the BDOF process.

Whether the two motion vectors are symmetric can be determined in different manners. As an example, if the two motion vectors' magnitudes (including horizontal and vertical components) are the same as each other, and the motion vectors' directions are opposite to each other, the two motion vectors can be determined to be symmetric. As another example, the two motion vectors can be rounded to the nearest integer, and the two integer motion vectors can then be compared. If the magnitudes of the two integer motion vectors are the same as each other, and the motion vectors' directions are opposite, the two motion vectors can be determined to be symmetric.

In some embodiments, the selection can be based on the magnitude of the motion vector of the current CU. For example, when it is determined that the motion vector's magnitude is smaller than a pre-defined threshold, the default mode can be applied for the current CU and the other mode can be disabled. Alternatively, when it is determined that the motion vector's magnitude is equal to or greater than a pre-defined threshold, the default mode can be disabled, and the other mode can be applied. It is appreciated that the default mode can be either the DMVR process or the BDOF process.

In some embodiments, the selection can be based on the size of the current CU. For example, when it is determined that the size of the current CU is smaller than a pre-defined threshold, the default mode can be applied for the current CU and the other mode can be disabled. Alternatively, when it is determined that the size of the current CU is equal to or greater than the pre-defined threshold, the default mode can be disabled and the other mode can be applied for the current CU. It is appreciated that the default mode can be the DMVR process or the BDOF process. Further, the size of the CU may be the width of the CU, the height of the CU, the number of luma samples within the CU, or the width plus the height of the CU.

In some embodiments, the selection can be based on the shape of the current CU. Because the BDOF process can be performed at a finer granularity (4×4) than the DMVR process (16×16), the BDOF process may be more suitable for blocks of a narrow-and-tall or flat-and-wide shape than the DMVR process. In some embodiments, the ratio of max(width, height) and min(width, height) may be calculated. If the ratio is higher than a pre-defined threshold, then the BDOF process may be applied and the DMVR process may be disabled. Alternatively, if the ratio is equal to or lower than the pre-defined threshold, then the DMVR process can be applied and the BDOF process can be disabled. The pre-defined threshold may be adjustable and may vary in different implementations.

In some embodiments, the selection may be based on the motion vectors of one or more neighboring blocks of the current CU. For example, the neighboring block may be the block to the left and/or to the top of the current CU. When the motion vector of the neighboring block is determined to be similar or substantially similar to the current CU, the default mode can be applied for the current CU and the other mode can be disabled. Alternatively, if the motion vector of the neighboring block is determined to be not substantially similar to the current CU, the default mode can be disabled and the other mode can be applied for the current CU. Whether the motion vector of the neighboring block is similar to that of the current CU can be determined based on a difference in magnitudes and/or directions between the two motion vectors. The difference can be further compared to a pre-defined threshold. For example, the default mode can be selected if the difference is greater than the pre-defined threshold. It is appreciated that the default mode can be the DMVR process or the BDOF process.

In some embodiments, the DMVR and the BDOF processes may be selected based on the signal statistics. The signal statistics may be the statistics associated with all previously decoded blocks in the current picture/frame, the statistics associated with previously decoded CTU(s), the statistics of collocated CTU(s) in a reference picture, or the statistics of the CTU(s) to the left and/or above. For example, if the default mode is selected for most of previously decoded blocks, the default mode can be selected to be performed for the current block. It is appreciated that the default mode can be the DMVR process or the BDOF process.

In some embodiments, selection of the DMVR and the BDOF processes may be inferred from the neighboring blocks. For example, if the default mode is applied to both of the left and top neighboring blocks, the default mode can be selected for the current block. It is appreciated that the default mode can be the DMVR process or the BDOF process. In some embodiments, the default mode may be signaled at the SPS level, the PPS level, the tile group level, or the CTU level.

In some embodiments, the current CU can be split into a plurality of sub-blocks. Selection of the DMVR and the BDOF processes can be performed at the sub-block level for each sub-block. The selection methods described above at the CU level may be applied for selection at the sub-block level, the details of which are not repeated herein. As an example, a CU can be split into 16×16 sub-blocks. For each sub-block, one of the DMVR and the BDOF processes can be selected based on the distortion of the corresponding two reference sub-blocks. The other selection methods described above can be similarly applied.

One advantage of implicitly selecting one of the DMVR and the BDOF process at the decoder side is that there is no signaling overhead, which may improve the coding efficiency. In some embodiments, a combination of explicit signaling and implicit derivation at the decoder side can be implemented.

In some embodiments, a flag may be signaled for a block of a size larger than or equal to a pre-defined threshold. The flag can be used to indicate which one of the DMVR and the BDOF processes is performed. For a block of a size smaller than the pre-defined threshold, one of the DMVR and the BDOF processes can be implicitly selected at the decoder side using the methods described above.

In some embodiments, when the number of luma sample within a block is larger than or equal to a pre-defined threshold, a CU level flag can be signaled, as shown in table 1300 illustrated in FIG. 13 (see syntax element 1310). When the number of luma sample within a block is smaller than the pre-defined threshold, in some embodiments, only the BDOF process is performed for the block if the conditions for the DMVR and the BDOF processes are both satisfied.

In some embodiments, when the number of luma sample within a block is larger or equal to a pre-defined threshold, a CU level flag can be signaled. When the number of luma sample within a block is smaller than the pre-defined threshold, the selection of the BDOF and the DMVR processes can be inferred from the neighboring blocks using one of the methods described above. For example, if the neighboring block(s) is intra-coded, the BDOF process can be applied as a default mode.

In some embodiments, the block shape may be further used in combination with the block size in the selection of the DMVR and the BDOF processes. For blocks that are large enough, a CU level flag can be signaled. Whether the size of a block is large enough can be determined based on, for example, the number of luma samples in the block. If the block is not large enough (e.g., the number of luma samples in the block is below a pre-defined threshold), the selection of the BDOF process and the DMVR process can be inferred from the block shape. For example, if the block is narrow-and-tall or wide-and-flat, then the BDOF process can be applied; otherwise, the DMVR process can be applied.

In some embodiments, the pre-defined thresholds regarding the size or ratio in the method embodiments described above may be signaled at different levels, for example, the CTU level, tile level, or SPS level. In some embodiments, the pre-defined thresholds can be defined based on the sequence resolution.

As noted above, in the coding process, a CU can be further partitioned into smaller units using different partition modes. In some embodiments of the present disclosure, triangle partition mode may be applied in the inter prediction process. For example, the triangle partition mode can be applied to CUs that are 8×8 or larger and are coded using skip or merge mode. For a CU satisfying these conditions, a CU-level flag can be signaled to indicate whether the triangle partition mode is applied or not.

Figure 14:
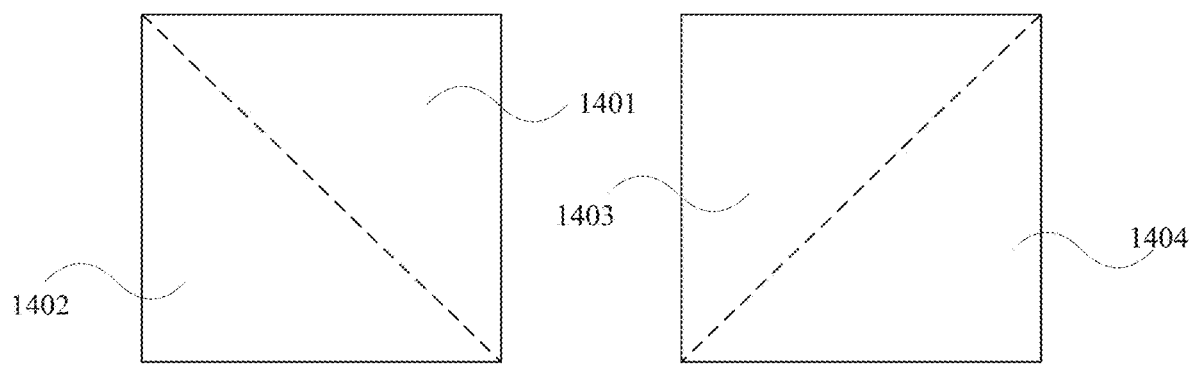
FIG. 14 illustrate examples of triangle partition based inter prediction, consistent with some embodiments of the present disclosure.

When the triangle partition mode is applied, a CU is split evenly into two triangle-shaped partitions, using either the diagonal split or the anti-diagonal split. As shown in FIG. 14, using the triangle partition mode, a CU can be split into partitions 1401 and 1402, or partitions 1403 and 1404. Each triangle partition in the CU can be inter predicted using its own motion vector. Further, consistent with some embodiments of the present disclosure, only uni-prediction can be applied for each partition. That is, each partition has one motion vector and one reference index. With the uni-prediction motion constraint, it can be ensured that only two motion compensated predictions are needed for each CU, similar to conventional bi-prediction.

If a current CU is coded using the triangle partition mode, a CU-level flag can be signaled to indicate the triangle partition mode is used. In some embodiments, if the triangle partition mode is used, then a flag indicating the direction of the triangle partition (diagonal or anti-diagonal), and two merge indices (one for each partition) can be further signaled. After predicting each of the triangle partitions, the sample values along the diagonal or anti-diagonal edge can be adjusted using a blending processing with adaptive weights. The prediction signal for the whole CU can be obtained. Transform and quantization process can be applied to the whole CU as in other prediction modes. Further, the motion field of a CU predicted using the triangle partition mode can be stored in 4×4 units.

Figure 15:
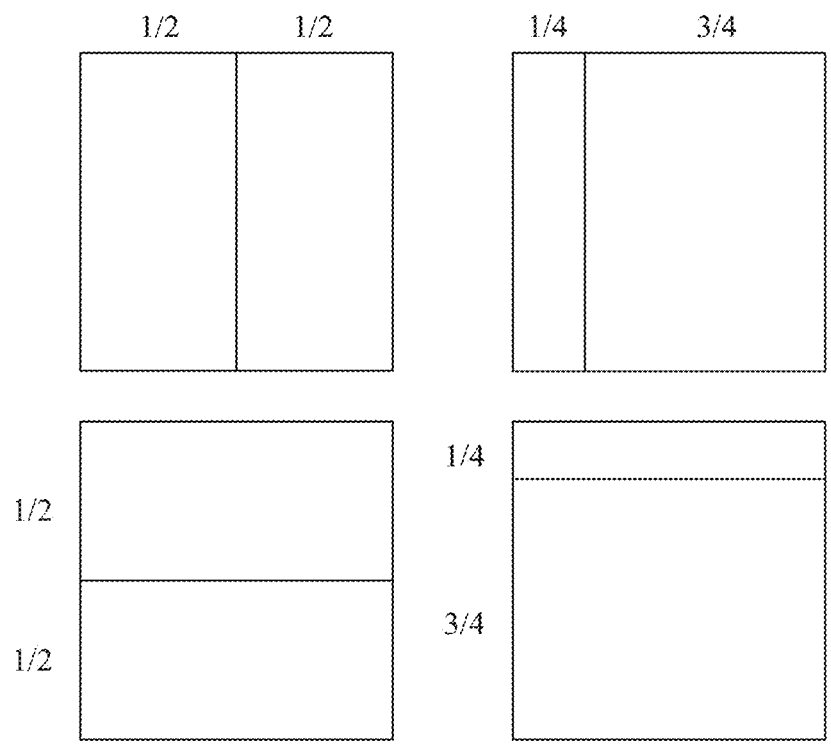
FIG. 15 illustrate examples of sub-block transform for inter predicted block, consistent with some embodiments of the present disclosure.

In some embodiments, sub-block transform can be applied for inter predicted block. In sub-block transform, a residual block can be split into two residual sub-blocks, as shown in FIG. 15. One of the two residual sub-blocks can be coded. For the other residual sub-block, the residue can be set equal to 0. For an inter prediction block with residue, a CU level flag can be signaled to indicate whether sub-block transform is applied or not. If the sub-block transform mode is used, parameters can be signaled to indicate that the residual block is symmetrically or asymmetrically split into two sub-blocks in either horizontal or vertical direction.

Figure 16:
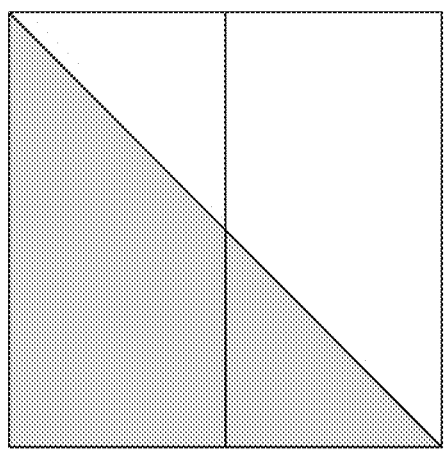
FIG. 16 illustrate an example of sub-block transform for inter predicted block when the triangle partition and sub-block transform mode are combined, consistent with some embodiments of the present disclosure.

Problems exist with the application of the triangle prediction and sub-block transform. For example, the sub-block transform mode may be applied to triangle partition inter block. An illustration of combining the triangle partition and sub-block transform mode is shown in FIG. 16, where a residual sub-block only contains parts of residue from two triangles. This may affect quality of the coding process.

To address the above problem, consistent with some embodiments of the present disclosure, the sub-block transform mode can be disabled when the triangle partition mode is used. Alternatively, when the sub-block transform mode is used, the triangle partition mode can be disabled. As an exemplary implementation, as shown table 1700 in FIG. 17, the sub-block transform flag cu_sbt_flag (see syntax element 1710 in FIG. 17) may not be signaled when the triangle partition mode is used.

Figure 18:
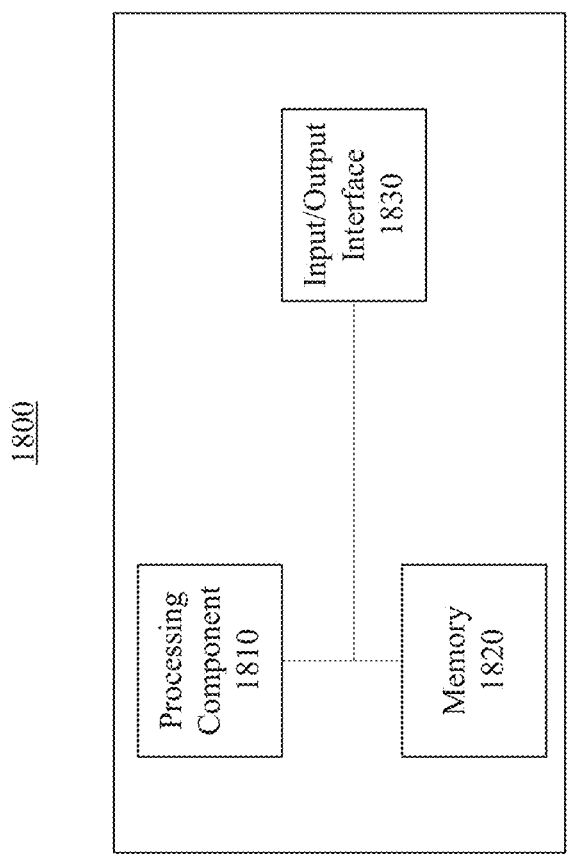
FIG. 18 is a block diagram of a video processing apparatus, consistent with some embodiments of the present disclosure.

FIG. 18 is a block diagram of an exemplary video processing apparatus 1800, consistent with some embodiments of the present disclosure. For example, apparatus 1800 may embody a video encoder (e.g., video encoder 200 in FIG. 2) or video decoder (e.g., video decoder 300 in FIG. 3) described above. Apparatus 1800 may be configured to perform the method embodiments described above. For example, apparatus 1800 may be configured to perform procedures described above for selecting one of the DMVR and the BDOF processes through explicitly signaling associated information in the bitstream, or through implicit derivation at the decoder side.

Referring to FIG. 18, apparatus 1800 may include a processing component 1810, a memory 1820, and an input/output (I/O) interface 1830. Apparatus 1800 may also include one or more of a power component and a multimedia component (not shown), or any other suitable hardware or software components.

Processing component 1810 may control overall operations of apparatus 1800. For example, processing component 1810 may include one or more processors that execute instructions to perform the above-described methods for selecting one of the DMVR and the BDOF processes. Moreover, processing component 1810 may include one or more modules that facilitate the interaction between processing component 1810 and other components. For instance, processing component 1810 may include an I/O module to facilitate the interaction between the I/O interface and processing component 1810.

Memory 1820 can be configured to store various types of data or instructions to support the operation of apparatus 1800. Memory 1820 may include a non-transitory computer-readable storage medium including instructions for applications or methods operated on apparatus 1800, executable by the one or more processors of apparatus 1800. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, cloud storage, a FLASH-EPROM or any other flash memory, NVRAM, a cache, a register, any other memory chip or cartridge, and networked versions of the same.

I/O interface 1830 provides an interface between processing component 1810 and peripheral interface modules, such as a camera or a display. I/O interface 1830 may employ communication protocols/methods such as audio, analog, digital, serial bus, universal serial bus (USB), infrared, PS/2, BNC, coaxial, RF antennas, Bluetooth, etc. I/O interface 1830 may also be configured to facilitate communication, wired or wirelessly, between apparatus 1800 and other devices, such as devices connected to the Internet. Apparatus can access a wireless network based on one or more communication standards, such as WiFi, LTE, 2G, 3G, 4G, 5G, etc.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Some embodiments of the present disclosure may further be described using the following clauses:

1. A method implemented by a decoder of video data, the method comprising:
   selecting one of a decoder side motion vector refinement (DMVR) process and a bi-directional optical flow (BDOF) process, based on a video bitstream; and
   inter predicting an image block based on the selected process.

2. The method according to clause 1, wherein selecting the one of the DMVR process and the BDOF process comprises:
selecting the one of the DMVR process and the BDOF process based on one or more flags signaled in the video bitstream.

3. The method according to clause 2, wherein the one or more flags include a flag signaled at a coding tree unit (CTU) level for a CTU including the image block, and the method further comprises:
in response to the flag having a first value, selecting the DMVR process; or
in response to the flag having a second value, selecting the BDOF process.

4. The method according to clause 2, wherein the one or more flags include a flag is signaled at a coding unit (CU) level for the image block, and the method further comprises:
in response to the flag having a first value, selecting the DMVR process; or
in response to the flag having a second value, selecting the BDOF process.

5. The method according to clause 4, further comprising:
decoding the flag using context-adaptive binary arithmetic coding (CABAC).

6. The method according to clause 2, wherein the one or more flags include a first flag signaled at the CTU level for a CTU including the image block, and the method further comprises:
determining whether the video bitstream includes a second flag signaled at the CU level for the image block, based on a value of the first flag;
in response to the video bitstream including the second flag, selecting the one of the DMVR process and the BDOF process based on a value of the second flag; and
in response to the video bitstream not including the second flag, selecting the one of the DMVR process and the BDOF process based on a default rule.

7. The method according to clause 1, wherein selecting the one of the DMVR process and the BDOF process comprises:
selecting the one of the DMVR process and the BDOF process based on a merge candidate index signaled in the video bitstream, the merge candidate index pointing to a merge candidate in a merge candidate list.

8. The method according to clause 7, wherein:
the merge candidate list is an extended merge candidate list that comprises a first merge candidate and a second merge candidate, the first merge candidate being same as the second merge candidate and having a smaller merge candidate index than the second merge candidate; and
the selecting the one of the DMVR process and the BDOF process comprises:
selecting the one of the DMVR process and the BDOF process based on whether the merge candidate index signaled in the video bitstream corresponds to the first or the second merge candidate.

9. The method according to clause 8, further comprising:
determining whether the first merge candidate corresponds to the DMVR process and the BDOF process, based on at least one of a shape or a size of the image block.

10. The method according to clause 1, wherein the selecting the one of the DMVR process and the BDOF process comprises:
selecting the one of the DMVR process and the BDOF process based on at least one of the following: a distortion of two reference blocks of the image block, a motion vector of the image block, a size of the image block, a shape of the image block, a motion vector associated with a neighboring block of the image block, or signal statistics.

11. The method according to clause 10, wherein the selecting the one of the DMVR process and the BDOF process further comprises:
determining whether the distortion of the two reference blocks of the image block is smaller than a pre-defined threshold; and
in response to the distortion of the two reference blocks being smaller than the pre-defined threshold, selecting the one of the DMVR process and the BDOF process.

12. The method according to clause 10, wherein the selecting the one of the DMVR process and the BDOF process further comprises:
determining whether two motion vectors for bi-predicting the image block are symmetric; and
in response to the two motion vectors being symmetric, selecting the one of the DMVR process and the BDOF process.

13. The method according to clause 10, wherein the selecting the one of the DMVR process and the BDOF process further comprises:
determining whether a magnitude of the motion vector of the image block is smaller than a pre-defined threshold; and
in response to the magnitude of the motion vector being smaller than the pre-defined threshold, selecting the one of the DMVR process and the BDOF process.

14. The method according to clause 10, wherein the selecting the one of the DMVR process and the BDOF process further comprises:
determining whether the size of the image block is smaller than a pre-defined threshold; and
in response to the size of the image block being smaller than the pre-defined threshold, selecting the one of the DMVR process and the BDOF process.

15. The method according to clause 10, wherein the selecting the one of the DMVR process and the BDOF process further comprises:
determining a ratio of max(width, height) and min(width, height) associated with the image block; and
in response to the ratio being higher than a pre-defined threshold, selecting the BDOF process.

16. The method according to clause 10, wherein the selecting the one of the DMVR process and the BDOF process further comprises:
determining whether the motion vector of the neighboring block is substantially similar to a motion vector of the image block; and
in response to the motion vector of the neighboring block being substantially similar to the motion vector of the image block, selecting the one of the DMVR process and the BDOF process.

17. The method according to clause 10, wherein the signal statistics includes at least one of the following:
statistics associated with a previously decoded block in a frame;
statistics associated with a previously decoded CTU;
statistics associated with a collocated CTU in a reference frame; or
statistics associated with a neighboring CTU.

18. The method according to clause 10, wherein the selecting the one of the DMVR process and the BDOF process further comprises:
determining a process applied for the neighboring block, the process being the BDOF process or the DMVR process; and selecting the process applied for the neighboring block as the process to be applied for the image block.

19. The method according to any of clauses 1-18, wherein the selecting the one of the DMVR process and the BDOF process comprises:
splitting the image block into a plurality of sub-blocks; and
selecting one of the DMVR process and the BDOF process for each of the plurality of sub-blocks.

20. The method according to clause 1, wherein the selecting the one of the DMVR process and the BDOF process further comprises:
determining whether a size of the image block is larger than or equal to a pre-defined threshold; and
in response to the size of the image block being determined to be larger than or equal to the pre-defined threshold, selecting the one of the DMVR process and the BDOF process for the image block based on a flag signaled at a CU level for the image block.

21. The method according to clause 20, further comprising:
in response to the size of the image block being determined to be smaller than the pre-defined threshold, selecting the BDOF process for the image block.

22. The method according to clause 20, further comprising:
in response to the size of the image block being determined to be smaller than the pre-defined threshold, selecting the one of the DMVR process and the BDOF process for the image block based on a shape of the image block.

23. The method according to any of clauses 20-22, wherein the size of the image block is determined based a number of luma samples within the image block.

24. The method according to any of clauses 20-22, wherein the pre-defined threshold is determined based on:
information signaled at at least one of: the CTU level, a tile level, or a sequence parameter set (SPS) level; or
information associated with sequence resolution.

25. A method for processing video data, comprising:
determining whether a triangle partition mode is applied to inter prediction of an image block; and
in response to the triangle partition mode being determined to be applied to the inter prediction of the image block, disabling a sub-block transform mode with respect to the image block.

26. A video processing apparatus, comprising:
a memory storing instructions; and
a processor configured to execute the instructions to cause the device to:
select one of a DMVR process and a BDOF process, based on a video bitstream; and
inter predict an image block based on the selected process.

27. The apparatus according to clause 26, wherein the processor is further configured to execute the instructions to:
select the one of the DMVR process and the BDOF process based on one or more flags signaled in the video bitstream.

28. The apparatus according to clause 27, wherein the one or more flags include a flag signaled at a CTU level for a CTU including the image block, and the processor is further configured to execute the instructions to cause the device to:
in response to the flag having a first value, select the DMVR process; or
in response to the flag having a second value, select the BDOF process.

29. The apparatus according to clause 27, wherein the one or more flags include a flag signaled at a CU level for the image block, and the processor is further configured to execute the instructions to cause the device to:
in response to the flag having a first value, select the DMVR process; or
in response to the flag having a second value, select the BDOF process.

30. The apparatus according to clause 29, wherein the processor is further configured to execute the instructions to cause the device to:
decode the flag using CABAC coding.

31. The apparatus according to clause 27, wherein the one or more flags include a first flag signaled at the CTU level for a CTU including the image block, and the processor is further configured to execute the instructions to cause the device to:
determine whether the video bitstream includes a second flag signaled at the CU level for the image block, based on a value of the first flag; and
perform operations comprising:
in response to the video bitstream including the second flag, selecting the one of the DMVR process and the BDOF process based on a value of the second flag, or
in response to the video bitstream not including the second flag, selecting the one of the DMVR process and the BDOF process based on a default rule.

32. The apparatus according to clause 26, wherein the processor is further configured to execute the instructions to:
select the one of the DMVR process and the BDOF process based on a merge candidate index in the video bitstream, the merge candidate index pointing to a merge candidate in a merge candidate list.

33. The apparatus according to clause 32, wherein:
the merge candidate list is an extended merge candidate list that comprises a first merge candidate and a second merge candidate, the first merge candidate being same as the second merge candidate and having a smaller merge candidate index than the second merge candidate; and
the processor is further configured to execute the instructions to:
select the one of the DMVR process and the BDOF process based on whether the merge candidate index signaled in the video bitstream corresponds to the first or the second merge candidate.

34. The apparatus according to clause 33, wherein the processor is further configured to execute the instructions to:
determine whether the first merge candidate corresponds to the DMVR process and the BDOF process, based on at least one of a shape or a size of the image block.

35. The apparatus according to clause 26, wherein the processor is further configured to execute the instructions to:
select the one of the DMVR process and the BDOF process based on at least one of the following: a distortion of two reference blocks of the image block, a motion vector of the image block, a size of the image block, a shape of the image block, a motion vector associated with a neighboring block of the image block, or signal statistics.

36. The apparatus according to clause 35, wherein the processor is further configured to execute the instructions to:
determine whether the distortion of the two reference blocks of the image block is smaller than a pre-defined threshold; and
if the distortion of the two reference blocks is smaller than the pre-defined threshold, select the one of the DMVR process and the BDOF process.

37. The apparatus according to clause 35, wherein the processor is further configured to execute the instructions to:

determine whether two motion vectors for bi-predicting the image block are symmetric; and if the two motion vectors are symmetric, select the one of the DMVR process and the BDOF process.

38. The apparatus according to clause 35, wherein the processor is further configured to execute the instructions to:

determine whether a magnitude of the motion vector of the image block is smaller than a pre-defined threshold; and if the magnitude of the motion vector is smaller than the pre-defined threshold, select the one of the DMVR process and the BDOF process.

39. The apparatus according to clause 35, wherein the processor is further configured to execute the instructions to:

determine whether the size of the image block is smaller than a pre-defined threshold; and if the size of the image block is smaller than the pre-defined threshold, select the one of the DMVR process and the BDOF process.

40. The apparatus according to clause 35, wherein the processor is further configured to execute the instructions to:

determine a ratio of max(width, height) and min(width, height) associated with the image block; and if the ratio is higher than a pre-defined threshold, select the BDOF process.

41. The apparatus according to clause 35, wherein the processor is further configured to execute the instructions to:

determine whether the motion vector of the neighboring block is substantially similar to a motion vector of the image block; and if the motion vector of the neighboring block is substantially similar to the motion vector of the image block, select the one of the DMVR process and the BDOF process.

42. The apparatus according to clause 35, wherein the signal statistics includes at least one of the following:

statistics associated with a previously decoded image block in a frame;

statistics associated with a previously decoded CTU;

statistics associated with a collocated CTU in a reference frame; or statistics associated with a neighboring CTU.

43. The apparatus according to clause 35, wherein the processor is further configured to execute the instructions to:

determine a process applied for the neighboring block, the process being the BDOF process or the DMVR process; and select the process applied for the neighboring block as the process to be applied for the image block.

44. The apparatus according to any of clauses 26-43, wherein the processor is further configured to execute the instructions to:

split the image block into a plurality of sub-blocks; and select one of the DMVR process and the BDOF process for each of the plurality of sub-blocks.

45. The apparatus according to clause 26, wherein the processor is further configured to execute the instructions to:

determine whether a size of the image block is larger than or equal to a pre-defined threshold; and if the size of the image block is determined to be larger than or equal to the pre-defined threshold, select the one of the DMVR process and the BDOF process for the image block based on a flag signaled at a CU level for the image block.

46. The apparatus according to clause 45, wherein the processor is further configured to execute the instructions to:

if the size of the image block is determined to be smaller than the pre-defined threshold, select the BDOF process for the image block.

47. The apparatus according to clause 45, wherein the processor is further configured to execute the instructions to:

if the size of the image block is determined to be smaller than the pre-defined threshold, select the one of the DMVR process and the BDOF process for the image block based on a shape of the image block.

48. The apparatus according to any of clauses 45-47, wherein the size of the image block is determined based a number of luma samples within the image block.

49. The apparatus according to any of clauses 45-47, wherein the pre-defined threshold is determined based on:

information signaled at at least one of: the CTU level, a tile level, or an SPS level; or information associated with sequence resolution.

50. A video processing apparatus, comprising:

a memory storing instructions; and a processor configured to execute the instructions to cause the device to:

determine whether a triangle partition mode is applied to inter prediction of to an image block; and if the triangle partition mode is determined to be applied to the inter prediction of the image block, disable a sub-block transform mode with respect to the image block.

51. A non-transitory computer-readable medium storing a set of instructions that is executable by one or more processors of a video processing device to cause the device to perform a method comprising:

selecting one of a DMVR process and a BDOF process, based on a video bitstream; and inter predicting an image block based on the selected process.

52. The non-transitory computer-readable medium according to clause 51, wherein selecting the one of the DMVR process and the BDOF process comprises:

selecting the one of the DMVR process and the BDOF process based on one or more flags signaled in the video bitstream.

53. The non-transitory computer-readable medium according to clause 52, wherein the one of more flags include a flag signaled at a CTU level for a CTU including the image block, and the method further comprises:

in response to the flag having a first value, selecting the DMVR process; or in response to the flag having a second value, selecting the BDOF process.

54. The non-transitory computer-readable medium according to clause 52, wherein the one or more flags include a flag signaled at a CU level for the image block, and the method further comprises:

in response to the flag having a first value, selecting the DMVR process; or in response to the flag having a second value, selecting the BDOF process.

55. The non-transitory computer-readable medium according to clause 54, wherein the method further comprises:

decoding the flag using CABAC coding.

56. The non-transitory computer-readable medium according to clause 52, wherein the one or more flags include a first flag signaled at the CTU level for a CTU including the image block, and the method further comprises:

determining whether the video bitstream includes a second flag signaled at the CU level for the image block, based on a value of the first flag;

in response to the video bitstream including the second flag, selecting the one of the DMVR process and the BDOF process based on a value of the second flag; and in response to the video bitstream not including the second flag, selecting the one of the DMVR process and the BDOF process based on a default rule.

57. The non-transitory computer-readable medium according to clause 51, wherein selecting the one of the DMVR process and the BDOF process comprises:

selecting the one of the DMVR process and the BDOF process based on a merge candidate index signaled in the video bitstream, the merge candidate index pointing to a merge candidate in a merge candidate list.

58. The non-transitory computer-readable medium according to clause 57, wherein:

the merge candidate list is an extended merge candidate list that comprises a first merge candidate and a second merge candidate, the first merge candidate being same as the second merge candidate and having a smaller merge candidate index than the second merge candidate; and the set of instructions is executable by the one or more processors of the device to cause the device to further perform:

selecting the one of the DMVR process and the BDOF process based on whether the merge candidate index signaled in the video bitstream corresponds to the first or the second merge candidate.

59. The non-transitory computer-readable medium according to clause 58, wherein the set of instructions is executable by the one or more processors of the device to cause the device to further perform:

determining whether the first merge candidate corresponds to the DMVR process and the BDOF process, based on at least one of a shape or a size of the image block.

60. The non-transitory computer-readable medium according to clause 51, wherein the selecting the one of the DMVR process and the BDOF process comprises:

selecting the one of the DMVR process and the BDOF process based on at least one of the following: a distortion of two reference blocks of the image block, a motion vector of the image block, a size of the image block, a shape of the image block, a motion vector associated with a neighboring block of the image block, or signal statistics.

61. The non-transitory computer-readable medium according to clause 60, wherein the selecting the one of the DMVR process and the BDOF process further comprises:

determining whether the distortion of the two reference blocks of the image block is smaller than a pre-defined threshold; and in response to the distortion of the two reference blocks of the image block being smaller than the pre-defined threshold, selecting the one of the DMVR process and the BDOF process.

62. The non-transitory computer-readable medium according to clause 60, wherein the selecting the one of the DMVR process and the BDOF process further comprises:

determining whether two motion vectors for bi-predicting the image block are symmetric; and in response to the two motion vectors being symmetric, selecting the one of the DMVR process and the BDOF process.

63. The non-transitory computer-readable medium according to clause 60, wherein the selecting the one of the DMVR process and the BDOF process further comprises:

determining whether a magnitude of the motion vector of the image block is smaller than a pre-defined threshold; and in response to the magnitude of the motion vector being smaller than the pre-defined threshold, selecting the one of the DMVR process and the BDOF process.

64. The non-transitory computer-readable medium according to clause 60, wherein the selecting the one of the DMVR process and the BDOF process further comprises:

determining whether the size of the image block is smaller than a pre-defined threshold; and in response to the size of the image block being smaller than the pre-defined threshold, selecting the one of the DMVR process and the BDOF process.

65. The non-transitory computer-readable medium according to clause 60, wherein the selecting the one of the DMVR process and the BDOF process further comprises:

determining a ratio of max(width, height) and min(width, height) associated with the image block; and in response to the ratio being higher than a pre-defined threshold, selecting the BDOF process.

66. The non-transitory computer-readable medium according to clause 60, wherein the selecting the one of the DMVR process and the BDOF process further comprises:

determining whether the motion vector of the neighboring block is substantially similar to a motion vector of the image block; and in response to the motion vector of the neighboring block being substantially similar to the motion vector of the image block, selecting the one of the DMVR process and the BDOF process.

67. The non-transitory computer-readable medium according to clause 60, wherein the signal statistics includes at least one of the following:

statistics associated with a previously decoded block in a frame;

statistics associated with a previously decoded CTU;

statistics associated with a collocated CTU in a reference frame; and statistics associated with a neighboring CTU.

68. The non-transitory computer-readable medium according to clause 60, wherein the selecting the one of the DMVR process and the BDOF process further comprises:

determining a process applied for the neighboring block, the process being the BDOF process or the DMVR process; and selecting the process applied for the neighboring block as the process to be applied for the image block.

69. The non-transitory computer-readable medium according to any of clauses 51-68, wherein the selecting the one of the DMVR process and the BDOF process comprises:

splitting the image block into a plurality of sub-blocks; and selecting one of the DMVR process and the BDOF process for each of the plurality of sub-blocks.

70. The non-transitory computer-readable medium according to clause 51, wherein the selecting the one of the DMVR process and the BDOF process further comprises:

determining whether a size of the image block is larger than or equal to a pre-defined threshold; and in response to the size of the image block being determined to be larger than or equal to the pre-defined threshold, selecting the one of the DMVR process and the BDOF process for the image block based on a flag signaled at a CU level for the image block.

71. The non-transitory computer-readable medium according to clause 70, wherein the set of instructions is executable by the one or more processors of the device to cause the device to further perform:

in response to the size of the image block being determined to be smaller than the pre-defined threshold, selecting the BDOF process for the image block.

72. The non-transitory computer-readable medium according to clause 70, wherein the set of instructions is executable by the one or more processors of the device to cause the device to further perform:

in response to the size of the image block being determined to be smaller than the pre-defined threshold, selecting the one of the DMVR process and the BDOF process for the image block based on a shape of the image block.

73. The non-transitory computer-readable medium according to any of clauses 70-72, wherein the size of the image block is determined based a number of luma samples within the image block.

74. The non-transitory computer-readable medium according to any of clauses 70-72, wherein the pre-defined threshold is determined based on:

information signaled at at least one of: the CTU level, a tile level, or an SPS level; or information associated with sequence resolution.

75. A non-transitory computer-readable medium storing a set of instructions that is executable by one or more processors of a video processing device to cause the device to perform a method comprising:

determining whether a triangle partition mode is applied to inter prediction of an image block; and in response to the triangle partition mode being determined to be applied to the inter prediction of the image block, disabling a sub-block transform mode with respect to the image block.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that the present invention is not limited to the exact construction that has been described above and illustrated in the accompanying drawings. Various modifications and changes can be made without departing from the scope thereof. It is intended that the scope of the invention should only be limited by the appended claims.

What is claimed is:

1. A method implemented by a decoder of video data, the method comprising:

selecting one of a decoder side motion vector refinement (DMVR) process and a bi-directional optical flow (BDOF) process, based on one or more flags signaled in a video bitstream, wherein:

the DMVR process is selected in response to at least one of the one or more flags having a first value; and the BDOF process is selected in response to the at least one of the one or more flags having a second value; and inter predicting an image block based on the selected process.

2. The method according to claim 1, wherein the one or more flags include a flag signaled at a coding tree unit (CTU) level for a CTU including the image block, and the method further comprises:

in response to the flag having a first value, selecting the DMVR process; or in response to the flag having a second value, selecting the BDOF process.

3. The method according to claim 1, wherein the one or more flags include a flag is signaled at a coding unit (CU) level for the image block, and the method further comprises:

in response to the flag having a first value, selecting the DMVR process; or in response to the flag having a second value, selecting the BDOF process.

4. The method according to claim 3, further comprising:

decoding the flag using context-adaptive binary arithmetic coding (CABAC).

5. The method according to claim 1, wherein the one or more flags include a first flag signaled at the CTU level for a CTU including the image block, and the method further comprises:

determining whether the video bitstream includes a second flag signaled at the CU level for the image block, based on a value of the first flag;

in response to the video bitstream including the second flag, selecting the one of the DMVR process and the BDOF process based on a value of the second flag; and in response to the video bitstream not including the second flag, selecting the one of the DMVR process and the BDOF process based on a default rule.

6. The method according to claim 1, wherein selecting the one of the DMVR process and the BDOF process comprises:

selecting the one of the DMVR process and the BDOF process based on a merge candidate index signaled in the video bitstream, the merge candidate index pointing to a merge candidate in a merge candidate list.

7. The method according to claim 6, wherein:

the merge candidate list is an extended merge candidate list that comprises a first merge candidate and a second merge candidate, the first merge candidate being same as the second merge candidate and having a smaller merge candidate index than the second merge candidate; and selecting the one of the DMVR process and the BDOF process comprises:

selecting the one of the DMVR process and the BDOF process based on whether the merge candidate index signaled in the video bitstream corresponds to the first or the second merge candidate.

8. The method according to claim 7, further comprising:

determining whether the first merge candidate corresponds to the DMVR process and the BDOF process, based on at least one of a shape or a size of the image block.

9. The method according to claim 1, wherein the selecting the one of the DMVR process and the BDOF process comprises:

selecting the one of the DMVR process and the BDOF process based on at least one of the following: a distortion of two reference blocks of the image block, a motion vector of the image block, a size of the image block, a shape of the image block, a motion vector associated with a neighboring block of the image block, or signal statistics.

10. The method according to claim 9, wherein the selecting the one of the DMVR process and the BDOF process further comprises:
  determining whether the distortion of the two reference blocks of the image block is smaller than a pre-defined threshold; and
  in response to the distortion of the two reference blocks being smaller than the pre-defined threshold, selecting the one of the DMVR process and the BDOF process.

11. The method according to claim 9, wherein the selecting the one of the DMVR process and the BDOF process further comprises:
  determining whether two motion vectors for bi-predicting the image block are symmetric; and
  in response to the two motion vectors being symmetric, selecting the one of the DMVR process and the BDOF process.

12. The method according to claim 9, wherein the selecting the one of the DMVR process and the BDOF process further comprises:
  determining whether a magnitude of the motion vector of the image block is smaller than a pre-defined threshold; and
  in response to the magnitude of the motion vector being smaller than the pre-defined threshold, selecting the one of the DMVR process and the BDOF process.

13. The method according to claim 9, wherein the selecting the one of the DMVR process and the BDOF process further comprises:
  determining whether the size of the image block is smaller than a pre-defined threshold; and
  in response to the size of the image block being smaller than the pre-defined threshold, selecting the one of the DMVR process and the BDOF process.

14. The method according to claim 9, wherein the selecting the one of the DMVR process and the BDOF process further comprises:
  determining a ratio of max(width, height) and min(width, height) associated with the image block; and
  in response to the ratio being higher than a pre-defined threshold, selecting the BDOF process.

15. The method according to claim 9, wherein the selecting the one of the DMVR process and the BDOF process further comprises:
  determining whether the motion vector of the neighboring block is substantially similar to a motion vector of the image block; and
  in response to the motion vector of the neighboring block being substantially similar to the motion vector of the image block, selecting the one of the DMVR process and the BDOF process.

16. The method according to claim 9, wherein the signal statistics includes at least one of the following:
  statistics associated with a previously decoded block in a frame;
  statistics associated with a previously decoded CTU;
  statistics associated with a collocated CTU in a reference frame; or
  statistics associated with a neighboring CTU.

17. The method according to claim 9, wherein the selecting the one of the DMVR process and the BDOF process further comprises:
  determining a process applied for the neighboring block, the process being the BDOF process or the DMVR process; and
  selecting the process applied for the neighboring block as the process to be applied for the image block.

18. The method according to claim 1, wherein the selecting the one of the DMVR process and the BDOF process comprises:
  splitting the image block into a plurality of sub-blocks; and
  selecting one of the DMVR process and the BDOF process for each of the plurality of sub-blocks.

19. The method according to claim 1, wherein the selecting the one of the DMVR process and the BDOF process further comprises:
  determining whether a size of the image block is larger than or equal to a pre-defined threshold; and
  in response to the size of the image block being determined to be larger than or equal to the pre-defined threshold, selecting the one of the DMVR process and the BDOF process for the image block based on a flag signaled at a CU level for the image block.

20. The method according to claim 19, further comprising:
  in response to the size of the image block being determined to be smaller than the pre-defined threshold, selecting the BDOF process for the image block.

21. The method according to claim 19, further comprising:
  in response to the size of the image block being determined to be smaller than the pre-defined threshold, selecting the one of the DMVR process and the BDOF process for the image block based on a shape of the image block.

22. The method according to claim 19, wherein the size of the image block is determined based a number of luma samples within the image block.

23. The method according to claim 19, wherein the pre-defined threshold is determined based on:
  information signaled at least one of: the CTU level, a tile level, or a sequence parameter set (SPS) level; or
  information associated with sequence resolution.

* * * * *